United States Patent
Liu et al.

(10) Patent No.: US 12,543,130 B2
(45) Date of Patent: Feb. 3, 2026

(54) ANGLE OF ARRIVAL-BASED LOCATION DETERMINATION USING PERIODIC ADVERTISING SYNCHRONIZATION

(71) Applicant: QUALCOMM Incorporated, San Diego, CA (US)

(72) Inventors: Tingting Liu, Cambridge (GB); Nicolas Graube, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 18/157,698

(22) Filed: Jan. 20, 2023

(65) Prior Publication Data

US 2024/0251363 A1  Jul. 25, 2024

(51) Int. Cl.
*H04W 56/00* (2009.01)
*H04W 48/10* (2009.01)

(52) U.S. Cl.
CPC ......... *H04W 56/001* (2013.01); *H04W 48/10* (2013.01)

(58) Field of Classification Search
CPC .............................. H04W 56/001; H04W 48/10
See application file for complete search history.

(56) References Cited

U.S. PATENT DOCUMENTS

| | | | | |
|---|---|---|---|---|
| 2011/0141930 A1* | 6/2011 | Verma | ................... | H04L 27/368 370/252 |
| 2016/0050595 A1* | 2/2016 | Roy | .................. | H04W 36/0061 370/331 |
| 2018/0160334 A1* | 6/2018 | Deshpande | ........... | H04W 36/22 |
| 2020/0029360 A1* | 1/2020 | Arvidson | ............... | H04W 74/08 |
| 2020/0037229 A1* | 1/2020 | Takahashi | ............... | H04W 4/06 |
| 2020/0100090 A1* | 3/2020 | Baik | ...................... | H04W 12/06 |
| 2020/0279279 A1* | 9/2020 | Chaudhuri | ............... | G06N 5/04 |
| 2020/0288392 A1* | 9/2020 | Rao | ...................... | H04B 7/0693 |
| 2021/0191674 A1* | 6/2021 | Hada | ................... | H04N 1/32765 |

(Continued)

FOREIGN PATENT DOCUMENTS

| | | | | | |
|---|---|---|---|---|---|
| CN | 114845374 A | * | 8/2022 | ........ | H04W 56/0035 |
| CN | 119487925 A | * | 2/2025 | .............. | H04W 4/80 |

(Continued)

OTHER PUBLICATIONS

WO 2022246838 PE2E Search machine Translation (Year: 2022).*

(Continued)

*Primary Examiner* — Sujoy K Kundu
*Assistant Examiner* — Vladislav Y Agureyev
(74) *Attorney, Agent, or Firm* — QUALCOMM Incorporated

(57) ABSTRACT

Disclosed are systems, apparatuses, processes, and computer-readable media for wireless communications. For example, a process can include receiving, from a network entity, synchronization information associated with a first set of periodic advertisements (PAs). A first time offset from a reference time can be determined based on the synchronization information, wherein the reference time is associated with synchronization of a plurality of wireless communication devices including the wireless communication device. A second set of PAs can be transmitted at a synchronized time based on the reference time and the first time offset, each PA of the second set of PAs including a constant tone extension (CTE).

28 Claims, 12 Drawing Sheets

(56) References Cited

U.S. PATENT DOCUMENTS

| | | | |
|---|---|---|---|
| 2021/0392564 A1* | 12/2021 | Arvidson | H04W 40/30 |
| 2022/0022132 A1 | 1/2022 | Knaappila | |
| 2022/0022153 A1* | 1/2022 | Harigai | H04W 4/80 |
| 2022/0051310 A1 | 2/2022 | Graube et al. | |
| 2022/0159436 A1 | 5/2022 | Lee et al. | |
| 2022/0272644 A1* | 8/2022 | Lee | H04S 3/00 |
| 2022/0303745 A1* | 9/2022 | Arvidson | H04W 40/246 |
| 2022/0416989 A1* | 12/2022 | Lee | H04W 48/10 |
| 2023/0140337 A1* | 5/2023 | Karlsson | G01S 5/0263 370/329 |
| 2023/0171729 A1* | 6/2023 | Oh | H04L 5/0048 455/456.1 |
| 2023/0269012 A1* | 8/2023 | Dong | H04S 1/007 381/311 |
| 2023/0388871 A1* | 11/2023 | Guo | H04W 36/0069 |
| 2024/0032123 A1* | 1/2024 | Cheong | H04W 76/15 |
| 2024/0179780 A1* | 5/2024 | Hintsala | H04J 3/0667 |

FOREIGN PATENT DOCUMENTS

| | | | | |
|---|---|---|---|---|
| WO | WO-2011021782 A2 * | 2/2011 | | H04W 4/029 |
| WO | WO-2018013245 A1 * | 1/2018 | | H04W 72/23 |
| WO | 2022246838 A1 | 12/2022 | | |

OTHER PUBLICATIONS

International Search Report and Written Opinion—PCT/US2023/082168—ISA/EPO—Apr. 11, 2024.
Zand P., "A High-accuracy Phase-based Ranging Solution with Bluetooth Low Energy (BLE)", 2019 IEEE Wireless Communications and Networking Conference, IEEE, Apr. 15, 2019, 8 Pages, XP033652153, Section III, Section IV, figures 1, 2, 3.

* cited by examiner

ANGLE OF ARRIVAL-BASED LOCATION DETERMINATION USING PERIODIC ADVERTISING SYNCHRONIZATION

FIELD OF THE DISCLOSURE

The present disclosure generally relates to wireless communications. For example, aspects of the present disclosure relate to angle of arrival (AoA)-based location determination in a synchronization system including one or more network devices (e.g., access points (APs)) and one or more wireless communication devices (e.g., peripheral devices, such as electronic shelf labels (ESLs)).

BACKGROUND OF THE DISCLOSURE

Short range wireless communication enables wireless communication over relatively short distances (e.g., within thirty meters). For example, BLUETOOTH® is a wireless technology standard for exchanging data over short distances using short-wavelength ultra-high frequency (UHF) radio waves from 2.4 gigahertz (GHz) to 2.485 GHz.

BLUETOOTH® Low Energy (BLE) is a form of BLUETOOTH® communication that allows for communication with devices running on low power. Such devices may include beacons, which are wireless communication devices that may use low-energy communication technology for positioning, proximity marketing, or other purposes. In some cases, such devices may serve as nodes (e.g., relay nodes) of a wireless mesh network that communicates and/or relays information to a managing platform or hub associated with the wireless mesh network.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one illustrative example, a method of wireless communication performed at a wireless communication device is provided, the method comprising: receiving, from a network entity, synchronization information associated with a first set of periodic advertisements (PAs); determining, based on the synchronization information, a first time offset from a reference time, wherein the reference time is associated with synchronization of a plurality of wireless communication devices including the wireless communication device; and transmitting a second set of PAs at a synchronized time based on the reference time and the first time offset, each PA of the second set of PAs including a constant tone extension (CTE).

In another example, a method of wireless communication performed at a wireless communication device is provided, the method comprising: receiving, from a network entity, synchronization information associated with a first set of periodic advertisements (PAs); determining, based on the synchronization information, a first time offset from a reference time, wherein the reference time is associated with synchronization of a plurality of wireless communication devices including the wireless communication device; and receiving, from a second wireless communication device of the plurality of wireless communication devices, a second set of PAs at a synchronized time based on the first time offset and the reference time, each PA of the second set of PAs including a constant tone extension (CTE).

In another example, a wireless communication device for wireless communications is provided. The wireless communication device includes at least one memory and at least one processor coupled to the at least one memory and configured to: receive, from a network entity, synchronization information associated with a first set of periodic advertisements (PAs); determine, based on the synchronization information, a first time offset from a reference time, wherein the reference time is associated with synchronization of a plurality of wireless communication devices including the wireless communication device; and transmit a second set of PAs at a synchronized time based on the reference time and the first time offset, each PA of the second set of PAs including a constant tone extension (CTE).

In another example, a wireless communication device for wireless communications is provided. The wireless communication device includes at least one memory and at least one processor coupled to the at least one memory and configured to: receive, from a network entity, synchronization information associated with a first set of periodic advertisements (PAs); determine, based on the synchronization information, a first time offset from a reference time, wherein the reference time is associated with synchronization of a plurality of wireless communication devices including the wireless communication device; and receive, from a second wireless communication device of the plurality of wireless communication devices, a second set of PAs at a synchronized time based on the first time offset and the reference time, each PA of the second set of PAs including a constant tone extension (CTE).

In another example, a non-transitory computer-readable medium is provided that includes instructions that, when executed by at least one processor, cause the at least one processor to: receive, from a network entity, synchronization information associated with a first set of periodic advertisements (PAs); determine, based on the synchronization information, a first time offset from a reference time, wherein the reference time is associated with synchronization of a plurality of wireless communication devices including the wireless communication device; and transmit a second set of PAs at a synchronized time based on the reference time and the first time offset, each PA of the second set of PAs including a constant tone extension (CTE).

In another example, a non-transitory computer-readable medium is provided that includes instructions that, when executed by at least one processor, cause the at least one processor to: receive, from a network entity, synchronization information associated with a first set of periodic advertisements (PAs); determine, based on the synchronization information, a first time offset from a reference time, wherein the reference time is associated with synchronization of a plurality of wireless communication devices including the wireless communication device; and receive, from a second wireless communication device of the plurality of wireless communication devices, a second set of PAs at a synchronized time based on the first time offset and the reference time, each PA of the second set of PAs including a constant tone extension (CTE).

In another example, an apparatus for wireless communications at a wireless communication device is provided. The apparatus includes: means for receiving, from a network entity, synchronization information associated with a first set of periodic advertisements (PAs); means for determining, based on the synchronization information, a first time offset from a reference time, wherein the reference time is associated with synchronization of a plurality of wireless communication devices including the wireless communication device; and means for transmitting a second set of PAs at a synchronized time based on the reference time and the first time offset, each PA of the second set of PAs including a constant tone extension (CTE).

In another example, an apparatus for wireless communications at a wireless communication device is provided. The apparatus includes: means for receiving, from a network entity, synchronization information associated with a first set of periodic advertisements (PAs); means for determining, based on the synchronization information, a first time offset from a reference time, wherein the reference time is associated with synchronization of a plurality of wireless communication devices including the wireless communication device; and means for receiving, from a second wireless communication device of the plurality of wireless communication devices, a second set of PAs at a synchronized time based on the first time offset and the reference time, each PA of the second set of PAs including a constant tone extension (CTE).

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
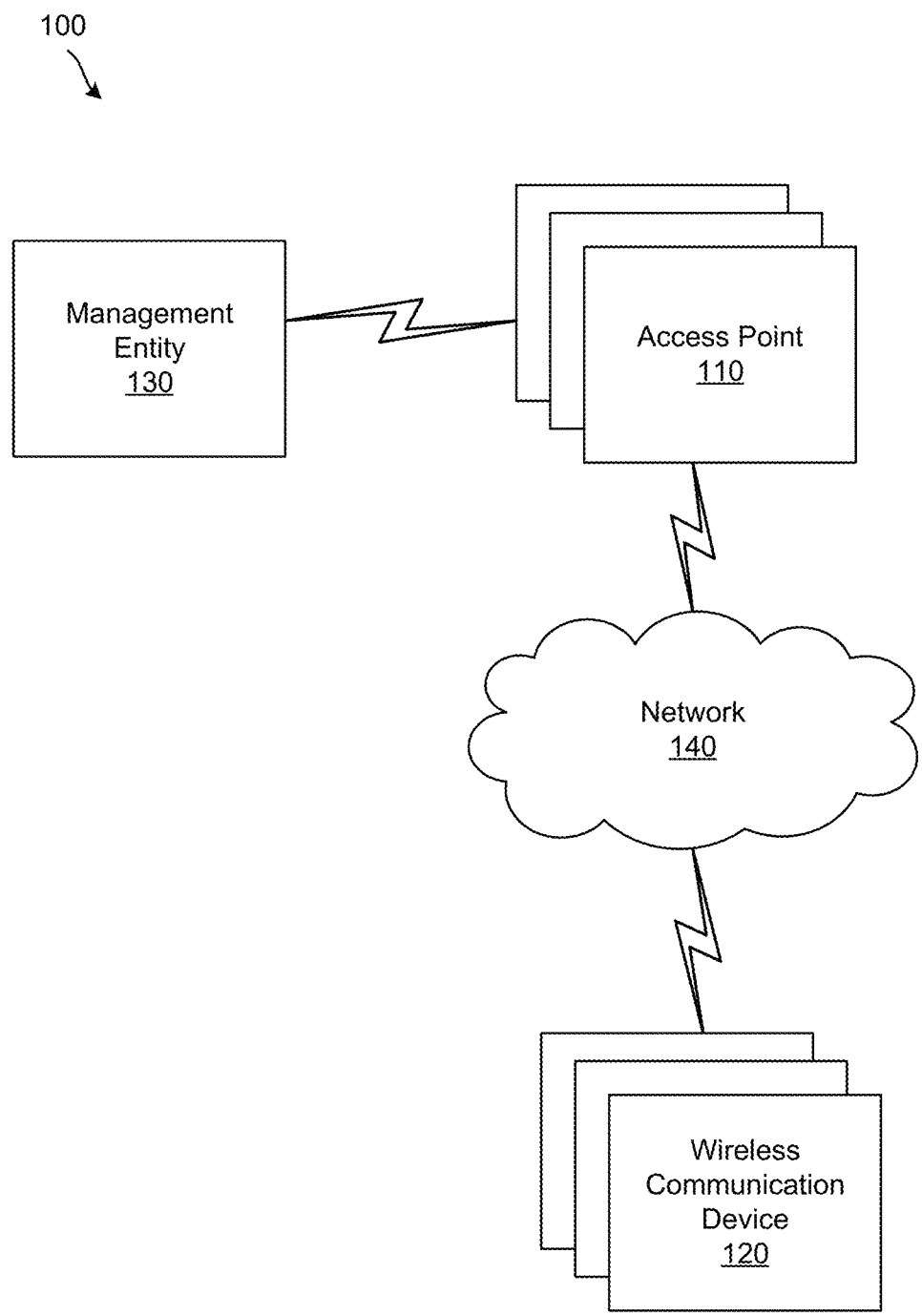
FIG. 1 is a diagram illustrating an example environment in which systems and/or methods described herein may be implemented, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

A system may include one or more wireless communication devices that are controlled by a network entity. For example, a system including multiple peripheral devices (e.g., an electronic shelf label (ESL) system) may include one or more wireless communication devices (e.g., peripheral devices, such as ESLs) that are controlled by a network entity, such as a management entity (ME), via at least one network device, such as an access point (AP). In one or more examples, to facilitate control by the ME, each peripheral device (e.g., ESL) may have a wireless connection (e.g., a BLUETOOTH® Low Energy (BLE) connection or other connection) to AP that is communicatively connected to the ME (e.g., via the Internet, such as wirelessly, via an Ethernet connection, etc.). In some cases, commands from the ME may be wirelessly transmitted to the peripheral devices (e.g., ESLs) by the AP. Responses or information from the peripheral devices may also be received by the AP and provided by the AP to the ME. Each AP may have an associated channel map. A channel map is a listing of frequency channels to be utilized or, conversely, not to be utilized (e.g., in the context of modification of frequency hopping sequences) by an AP for communication, such as with the ESLs or other peripheral devices. While examples are described herein using ESLs as illustrative examples of wireless communication devices, a management entity as an example of a network entity, and access points as examples of network devices, the systems and techniques described herein are applicable to any type of system or network.

In some examples, ESL systems can be deployed to support and manage ESL devices in stores (e.g., supermarkets) and other retail spaces. In some examples, ESL systems may be deployed to support and manage ESL devices in warehouses (e.g., distribution centers) and other industrial spaces. For instance, in a store, ESLs may be provided as electronic labels that are affixed to store shelves to identify the items and the price of the items located on the store shelf above the label. ESLs may be each implemented with a display (e.g., a liquid crystal display (LCD), an electronic paper (e-paper) display, etc.). The ESL may digitally display the name of the item, a product identification number for the item, such as a stock keeping unit (SKU) number, and a price for the item. The ESL may additionally display a barcode for the item, a quick response (QR) code for the item, and/or an image (e.g., a picture) of the item. In some examples, each ESL may include a display and a radio or wireless transceiver for communicating with one or more APs and/or MEs included in the ESL system. For example, during operation of the ESL system, the information displayed on the ESLs may be updated periodically by using periodic advertisements (PAs), as will be described in greater depth below.

As noted previously, in some examples, ESL systems can additionally, or alternatively, be used to support and manage ESL devices in warehouses (e.g., distributions) and other industrial spaces. For example, in a warehouse or distribution center, ESL devices can be provided as trackers that are attached to pallets or various other shipping containers that are moved throughout the warehouse and/or transported in a supply chain. In some examples, a tracker can be provided as a printed active (e.g., battery-powered) Bluetooth® Low Energy (BLE) label. A BLE tracker can be implemented based on (e.g., can be compliant with) the ESL protocol. For example, a BLE tracker can be attached to a pallet of merchandise and used to track the pallet of merchandise as it moves from a global distribution center (GDC) to a retail store environment.

In ESL systems, periodic advertisements (PAs) can be utilized to provide regular and predictable payload transmissions from a network device (e.g., such as an AP) to one or more wireless communication devices (e.g., such as ESLs). For example, PAs can be used to issue information from a network device to multiple wireless communication devices, which may be within one or more groups of wireless communication devices. PAs are generally unidirectional (e.g., unidirectional transmissions) such that PAs are transmitted only one-way from a network device (e.g., AP) to one or more wireless communication devices (e.g., ESLs). In some examples, the information displayed on the ESLs may be updated periodically by using periodic advertisements (PAs), as noted previously above.

Periodic Advertisement with Response (PAwR) can be used for ESL systems to provide bidirectionality (e.g., bidirectional transmissions between a central device and one or more peripheral devices). Wireless communication devices (e.g., peripheral devices, such as ESLs) synchronized within a group of wireless communication devices can be addressed by a network device (e.g., AP) on a synchronized channel (e.g., a radio frequency (RF) channel between the network device and the wireless communication devices) whenever the network device chooses to send (e.g., transmit on a synchronized subevent) a request to the wireless communication devices. In some cases, as used herein, a synchronized channel refers to a channel on which transmissions are synchronized (in time). For example, the channel can utilize or can be based on a frequency on which one or more communications are transmitted. A hopping frequency sequence can be associated with the channel, where the hopping frequency sequence progresses at a fixed and/or pre-determined interval. A central device (e.g., AP, ME, etc.) and one or more peripheral devices (e.g., ESLs) can concurrently track the hopping frequency sequence at the pre-defined frequency hopping pattern (e.g., such that the central device knows when to transmit the request and the peripheral devices know when to listen for and/or receive the request).

In some cases, a request transmitted by a central device to peripheral devices in a particular group may be a PA containing a synchronization message transmitted by the central device on the synchronized channel to the peripheral devices of the particular group. For example, an AUX_SYNC_SUBEVENT_IND message can contain an AP Sync command. For example, wireless communication devices (e.g., ESLs) within the particular group can wake up (e.g., from a low power (LP) mode) at the same PA transmission with respect to a particular PAwR train for that group. For instance, ESLs within a particular group can wake up at the same particular sub-frame of a plurality of sub-frames (e.g., a PA frame may include 128 sub-frames, with a sub-interval of 12.5 ms). A PA transmission can include a periodic set of transmissions, which may be collectively referred to as a PA train, or a PAwR train when applied to PAwR. Each transmission of a PA train (or PAwR train) occurs at a precise point in time, with fixed intervals between the transmissions. A communication channel (e.g., one communication channel out of thirty-seven available communication channels) is selected for each of the transmissions, where the communication channel follows a hopping frequency sequence.

The synchronization between the central device and the peripheral devices in the group can be based on the periodicity of the PA. The periodically-transmitted messages (e.g., the synchronization messages) can include zero, one, or more commands (e.g., a respective operational code (OpCode) and parameters associated with each command). For example, the synchronization messages can include an AUX_SYNC_IND message associated with a PA train and/or can include an AUX_SYNC_SUBEVENT_IND message associated with PAwR for APs/ESLs. If a response from a wireless communication device is expected by the network device (e.g., the synchronization message from the network device requests a response from a specific wireless communication device), the particular wireless communication device can respond in a specific response slot, which may be based on where the wireless communication device appeared within a sequence contained within the synchronization message transmitted by the network device.

In some cases, one or more ESLs may be physically moved to a new location. For example, one or more ESLs may be moved from one location in a retail store (e.g., a particular shelf or a storage area) to a different location in the retail store, to a different retail store location, etc. In some examples, store shelves (e.g., with a plurality of ESLs attached thereto) may be attached to a gondola that allows the moving or repositioning the shelves and the products provided on the shelves. In another example, an ESL that is provided as a tracker (e.g., such as a printed active BLE label) may by physically moved during transportation of a pallet (e.g., to which the tracker is attached) from a distribution center to a retail store location.

In some examples, an ESL system can be associated with one or more location systems that can be used to determine location information of an ESL device and/or to determine location information of a particular item to which an ESL device is attached or otherwise associated. For instance, location information can be determined in an ESL system based on one or more Angle-of-Arrival (AoA) measurements. AoA measurements can be indicative of a relative direction at which a propagating radio frequency (RF) wave that was transmitted using an antenna (e.g., an antenna of a transmitting device) is incident on an antenna array (e.g., an antenna array of a receiving device).

AoA measurements can be used to determine location information of a static (e.g., non-moving or stationary) wireless communication device. AoA measurements may additionally, or alternatively, be used to determine location information of a moving wireless communication device. AoA measurements can be obtained based on an AoA transmitter device (e.g., a first wireless communication device) transmitting one or more pre-determined signals using a single antenna, and an AoA receiver device (e.g., a second wireless communication device) receiving the transmitted signal(s) using at least two antennas of a multiple antenna array. For example, an AoA transmitter device can transmit one or more direction-finding signals using a single antenna, and an AoA receiver device can receive some (or all) of the direction-finding signals using a multiple antenna array. Based on the receiver using a multi-antenna array to receive the AoA signal, one or more phase differences can be determined between the AoA signal, as received at different antennas of the multi-antenna array. In some examples, a direction of the transmitter can be determined (e.g., relative to the receiver, relative to the multi-antenna array, etc.) based on the calculated phase differences. For instance, an angle of arrival determination can be made based on the wavelength of the AoA signal, distance(s) between the antennas of the multi-antenna array, and the phase of the received AoA signal at various antennas of the multi-antenna array.

In some examples, AoA information can be determined using one or more constant tone extensions (CTEs). For example, one or more AoA transmitter can generate and transmit signals that each include a CTE field. One or more AoA receivers can receive transmitted signals that each include a CTE field and can subsequently determine phase measurements and/or phase differences based on using the CTE field to determine phase information of each received CTE. In some examples, a CTE field can comprise a sequence of bits with a variable duration from 16 μs to 160 μs. For instance, the CTE field can contain a modulated series of 1 bits that are transmitted at one frequency and with a constant wavelength. A CTE signal can be un-whitened (e.g., is not subjected to whitening, which is a process that scrambles signals to ensure there will be no long strings of 1s or 0s. In some cases, based on the CTE comprising an un-whitened series of bits that are transmitted at the same frequency and with a constant wavelength, a phase of the CTE signal may be measured more easily and/or more efficiently than for various other signals (e.g., and AoA information is determined based on measuring the phase of a received signal).

In some examples, ESL devices and/or ESL systems can perform AoA-based location determination based on a CTE field that is appended to another transmission. For example, a CTE can be appended to an existing transmission, such as a periodic advertisement (PA). A periodic advertisement that includes a CTE may also be referred to herein as a PA CTE. Some AoA-based location determination tasks performed by an ESL device and/or an ESL system may be based on receiving multiple PA CTEs (e.g., multiple PAs each including a CTE field) from multiple PA transmitters. For instance, ESL-based AoA location determination performed for triangulation, static, and/or moving use cases may require an ESL (e.g., configured as an AoA receiver) to measure PA CTEs from multiple different PA transmitters.

In some cases, the accuracy of AoA measurements and determinations performed based on PA CTEs transmitted by multiple different PA transmitters can be based on the synchronization (or lack of synchronization) that is present between the multiple PA transmitters. For example, other PAs (e.g., PAs that are not augmented with a CTE) may also be transmitted in the same wireless environment as the PA CTEs utilized by an ESL AoA location determination system. For instance, PA CTEs used to perform AoA-based location determinations may exist on a shared wireless medium with various other PAs utilized by the ESL devices and the ESL system.

There is a need to maintain time synchronization between the ESLs participating in the AoA measurement. For example, there is a need to maintain time synchronization between Tx ESLs that transmit PA CTEs and Rx ESLs that receive PA CTEs. There is a further need to maintain time synchronization between multiple, different Tx ESLs that each transmit PA CTEs. If some (or all) of the Tx ESLs and Rx ESLs participating in an AoA measurement using PA CTEs are unsynchronized, or otherwise experience drift away from a previously synchronized state, collisions or conflicts may occur between the AoA PA CTEs and other PAs on the wireless medium.

For example, some (or all) of the Tx ESLs and the Rx ESLs may be associated with a periodic advertisement with response (PAwR) train that transmits and receives on pre-determined slots. In a synchronized state between the ESLs, the transmit and receive slots for the AoA PA CTEs can be separated from the pre-determined slots that are associated with the existing PAwR train(s) of the ESLs. Time drift and other degradations of the synchronization state can result in an AoA PA CTE transmission and a PAwR transmission experiencing a collision or conflict. For instance, an AoA Tx ESL may be unable to transmit a scheduled PA CTE if time drift or loss of synchronization causes the AoA Tx ESL to attempt transmission of the PA CTE on the same time slot as an existing PAwR transmission. Similarly, an AoA Rx ESL may be unable to receive a scheduled PA CTE if time drift or loss of synchronization causes the AoA Rx ESL to attempt reception of the PA CTE on the same time slot as an existing PAwR reception.

There is a need for systems and techniques that can be used to establish and maintain time synchronization between ESLs associated with transmitting or receiving AoA PA CTEs. For example, there is a need for systems and techniques that can be used to prevent drifting of PA CTEs relative to a PAwR train and/or that can be used to synchronize multiple AoA PA CTEs (e.g., such that an AoA Rx ESL can receive multiple, mutually synchronized AoA PA CTEs transmitted by different ESLs). There is also a need to provide mutually synchronized AoA PA CTEs across multiple PAwR trains (e.g., across multiple APs each associated with a different PAwR train). There is a further need for systems and techniques that can maintain time synchronization and avoid collisions when the AoA PA CTE transmissions are provided on multiple different PA CTE trains. For instance, there is a need for systems and techniques that can maintain time synchronization between AoA Tx and Rx ESLs that utilize multiple PA CTE trains, such that a PA CTE transmission of a given PA CTE train does not collide or conflict with a PA CTE transmission of any other PA CTE trains and additionally does not collide or conflict with a PAwR transmission of any PAwR trains associated with the AoA Tx and Rx ESLs.

Systems and techniques are described herein that can be used to perform location determination based on periodic advertising (PA) synchronization. For example, the systems and techniques can be used to perform angle of arrival (AoA)-based location determination based on PA synchronization. In some examples, AoA-based location determination can be performed using one or more wireless communication devices (e.g., such as an electronic shelf label (ESL) or other peripheral device). In some cases, the PA synchronization can be performed using an access point (AP) synchronization system. The AP synchronization system may be included in or provided as an ESL system.

In some examples, AoA information and/or AoA-based location information can be determined based on one or more constant tone extensions (CTEs). For instance, one or more wireless communication devices (e.g., ESLs) can transmit one or more periodic advertisements with constant tone extensions (PA CTEs). The one or more PA CTEs can be included in or otherwise associated with a periodic advertisement train (e.g., PA train). A PA train of PA CTEs can also be referred to as a PA CTE train. Wireless communication devices (e.g., ESLs) used to transmit or form a PA CTE train for AoA-based location determination can also be referred to herein as Tx ESLs or AoA Tx ESLs. One or more wireless communication devices (e.g., ESLs) can receive one or more of the PA CTEs transmitted by the Tx ESLs. Wireless communication devices (e.g., ESLs) used to receive PA CTEs transmitted by a Tx ESL can also be referred to herein as Rx ESLs or AoA Rx ESLs.

In some examples, a shared or common starting time (e.g., a synchronized starting time) can be determined for one or more PA trains associated with the Tx and Rx ESLs. For instance, each AoA Tx ESL may form a respective PA train for transmitting a PA CTE. In one illustrative example, each AoA Tx ESL can form its respective PA train at a starting time that is based on a synchronized starting time (e.g., shared across all of the AoA Tx ESLs) and an individual offset for avoiding collisions (e.g., particular to each respective one of the AoA Tx ESLs). Each Rx ESL can synchronize with some (or all) of the PA trains formed by the Tx ESLs and can receive a plurality of PA CTEs transmitted by the Tx ESLs. In some examples, by using the same starting time to form the Tx ESL PA trains and the Rx ESL PA train(s), the systems and techniques can synchronize the Tx ESLs and the Rx ESLs (e.g., the systems and techniques can synchronize AoA-based location determination performed using the Tx and Rx ESLs).

In some cases, the synchronized starting time can be determined based on a common synchronized clock that is associated with the Tx and Rx ESLs. For example, the synchronized starting time can be determined based on a synchronized clock of an access point (AP) or other network entity that is associated with the Tx and Rx ESLs. In some examples, the synchronized starting time can be determined based on one or more AP synchronization messages (e.g., AP_SYNC packet(s)). For instance, AP_SYNC packets can be used to perform time synchronization between an AP and one or more ESLs that are associated with the AP (e.g., one or more Tx ESLs and one or more Rx ESLs). In some aspects, the synchronized starting time for the Tx and Rx ESL PA CTE trains used to perform AoA-based location determination can be provided as an offset relative to an existing periodic advertisement (PA). In some aspects, the use of a synchronized starting time and individual offsets for each AoA Tx ESL can be used to avoid collisions between different PA CTE trains (e.g., formed by different AoA Tx ESLs) and can additionally be used to avoid collisions with an existing PAwR train (e.g., between an AP and ESLs, including the Tx and Rx ESLs). In some examples, the AoA Tx ESLs can form respective PA CTE trains that avoid collisions with AP_SYNC messages and/or frequently used response slots of the PAwR train.

For example, the PA CTE trains of the Tx and Rx ESLs can each be associated with the same synchronized starting time, wherein the synchronized starting time is determined as an offset from a periodic advertisement with response (PAwR) subevent. The PAwR sub-event (e.g., of a PAwR train) and the PA CTE trains can be associated with the same Tx and Rx ESLs. For example, the Tx and Rx ESLs may be associated with or identified by a group identifier (e.g., group ID). The PAwR sub-event and/or the PAwR train, and the PA CTE trains, can each be associated with the same group ID of the Tx and Rx ESLs.

In some examples, the systems and techniques can determine synchronization information (e.g., syncInfo) for one or more PA CTE trains using the syncInfo of a common existing PA train. For example, synchronization information for forming one or more PA CTE trains using the Tx and Rx ESLs can be generated based on synchronization information of an existing PAwR train associated with a group that includes the Tx and Rx ESLs.

In one illustrative example, the Tx and Rx ESLs can be included in a group that is associated with an AP (e.g., the Tx and Rx ESLs connect to and communicate with the same AP). In such examples, the synchronization information for forming PA CTE trains that can be used to perform AoA-based location determination can be determined based on synchronization information of a PAwR train associated with the AP. For instance, the PAwR train can include one or more synchronization messages (e.g., such as AP_SYNC packets) that are transmitted by the AP to the Tx and Rx ESLs. In some aspects, the synchronization information for forming the PA CTE trains can comprise at least a portion of the PAwR train synchronization information and new or additional synchronization information that can be used to identify respective ones of the PA CTE trains that are to be formed.

Additional aspects of the present disclosure are described with reference to the figures.

FIG. 1 is a diagram of an example environment 100 in which systems and/or methods described herein may be implemented. As shown in FIG. 1, the environment 100 may include at least one access point (AP) 110, at least one wireless communication device 120, a management entity (ME) 130, and a network 140. Devices of the environment 100 may interconnect via wired connections, wireless connections, or a combination of wired and wireless connections.

The access point 110 may include one or more devices capable receiving, generating, storing, processing, providing, and/or routing information associated with access point synchronization and/or handover, as described elsewhere herein. The access point 110 may include a communication device and/or a computing device. The access point 110 may be configured to transmit beacons (e.g., BLE beacons), as well as to scan and locate other devices (e.g., other devices communicating using BLE protocols).

The wireless communication device 120 may include one or more devices capable of receiving, generating, storing, processing, and/or providing information associated with access point synchronization and/or handover, as described elsewhere herein. The wireless communication device 120 may include a communication device and/or a computing device. In some aspects, the wireless communication device 120 may be, may include, or may be included in an electronic shelf label (ESL).

The management entity 130 includes one or more devices capable of receiving, generating, storing, processing, providing, and/or routing information associated with access point synchronization and/or handover, as described elsewhere herein. The management entity 130 may include a communication device and/or a computing device. For example, the management entity 130 may include a server, such as an application server, a client server, a web server, a database server, a host server, a proxy server, a virtual server (e.g., executing on computing hardware), or a server in a cloud computing system. In some aspects, the management entity 130 includes computing hardware used in a cloud computing environment. The management entity 130 may provide control of a system (e.g., an ESL system) that includes the access point(s) 110, the wireless communication device(s) 120, and/or the device(s) 130. The access point(s) 110 may be communicatively connected to the management entity 130 via a network (not shown), such as the Internet.

The network 140 may include one or more wireless networks. For example, the network 140 may include a personal area network (e.g., a Bluetooth network). The network 140 enables communication among the devices of environment 100.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
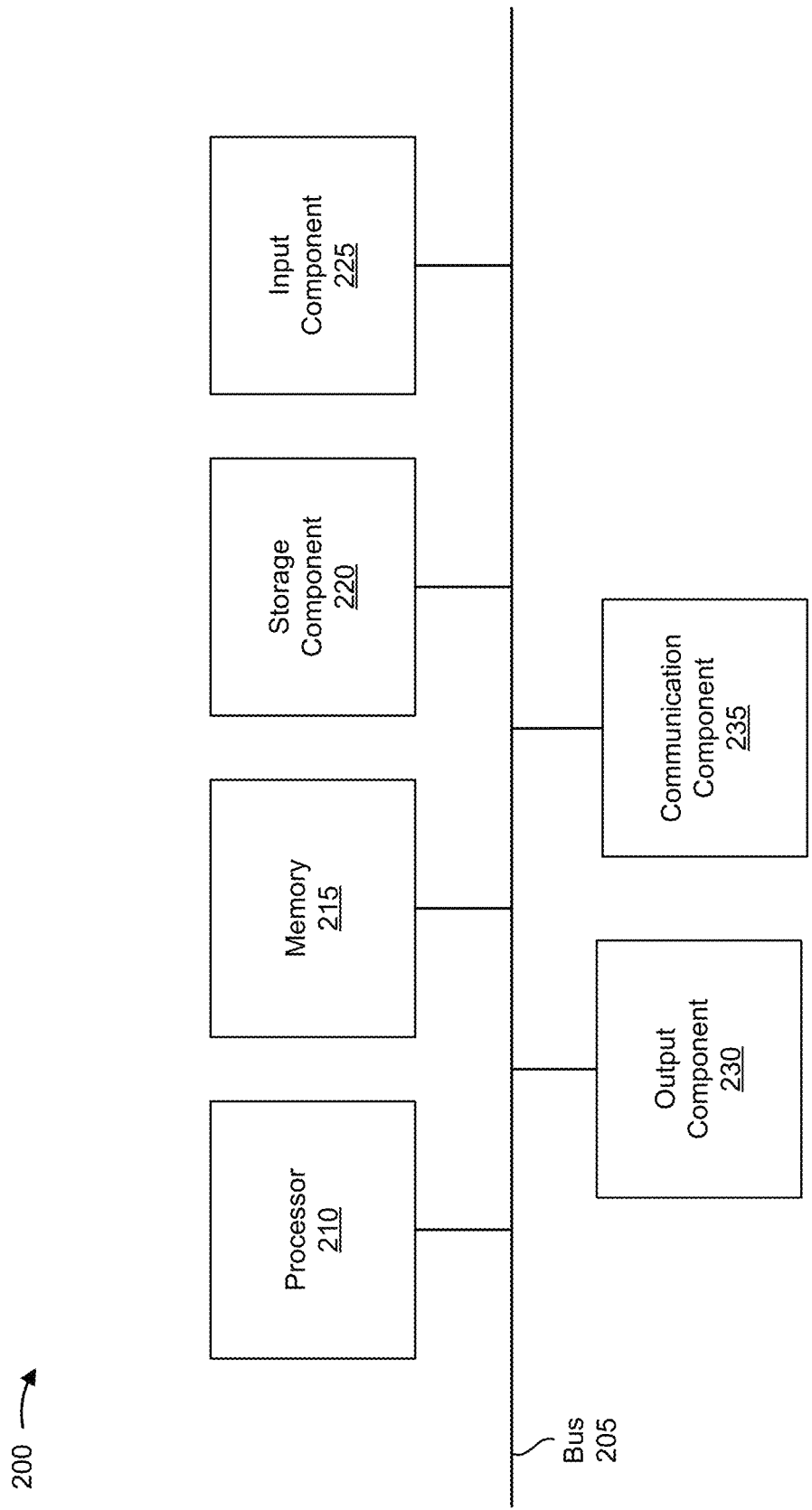
FIG. 2 is a diagram illustrating example components of a device, in accordance with some examples.

FIG. 2 is a diagram illustrating example components of a device 200, in accordance with the present disclosure. Device 200 may correspond to access point 110, wireless communication device 120, and/or management entity 130. In some aspects, access point 110, wireless communication device 120, and/or management entity 130 may include one or more devices 200 and/or one or more components of device 200. As shown in FIG. 2, device 200 may include a bus 205, a processor 210, a memory 215, a storage component 220, an input component 225, an output component 230, and/or a communication component 235.

Bus 205 may include a component that permits communication among the components of device 200. Processor 210 may be implemented in hardware, firmware, or a combination of hardware and software. Processor 210 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 may include one or more processors capable of being programmed to perform a function. Memory 215 may include a random access memory (RAM), a read only memory (ROM), and/or another type of dynamic or static storage device (e.g., a flash memory, a magnetic memory, and/or an optical memory) that stores information and/or instructions for use by processor 210.

Storage component 220 can store information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 may include a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 can include a component that provides output information from device 200 (e.g., a display, a speaker, a haptic feedback component, and/or an audio or visual indicator).

Communication component 235 may include one or more transceiver-like components (e.g., a transceiver and/or a separate receiver and transmitter) that enables device 200 to communicate with other devices, such as via a wired connection, a wireless connection, or a combination of wired and wireless connections. Communication component 235 may permit device 200 to receive information from another device and/or provide information to another device. For example, communication component 235 may include an Ethernet interface, an optical interface, a coaxial interface, an infrared interface, a radio frequency interface, a universal serial bus (USB) interface, a wireless local area interface (e.g., a Wi-Fi interface or a BLE interface), and/or a cellular network interface.

Communication component 235 may include one or more antennas for receiving wireless radio frequency (RF) signals transmitted from one or more other devices, cloud networks, and/or the like. The antenna may be a single antenna or an antenna array (e.g., antenna phased array) that can facilitate simultaneous transmit and receive functionality. The antenna may be an omnidirectional antenna such that signals can be received from and transmitted in all directions. The wireless signals may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network.

The one or more transceiver-like components (e.g., a wireless transceiver) of the communication component 235 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals into a baseband or intermediate frequency and can convert the RF signals to the digital domain.

In some cases, a CODEC may be implemented (e.g., by the processor 210) to encode and/or decode data transmitted and/or received using the one or more wireless transceivers. In some cases, encryption-decryption may be implemented (e.g., by the processor 210) to encrypt and/or decrypt data (e.g., according to the Advanced Encryption Standard (AES) and/or Data Encryption Standard (DES) standard) transmitted and/or received by the one or more wireless transceivers.

In some aspects, device 200 may represent an ESL. The ESL may include a battery in addition to the aforementioned components. In some aspects, the output component 230 of the ESL may be an electronic paper (e-paper) display or a liquid crystal display (LCD).

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication component 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
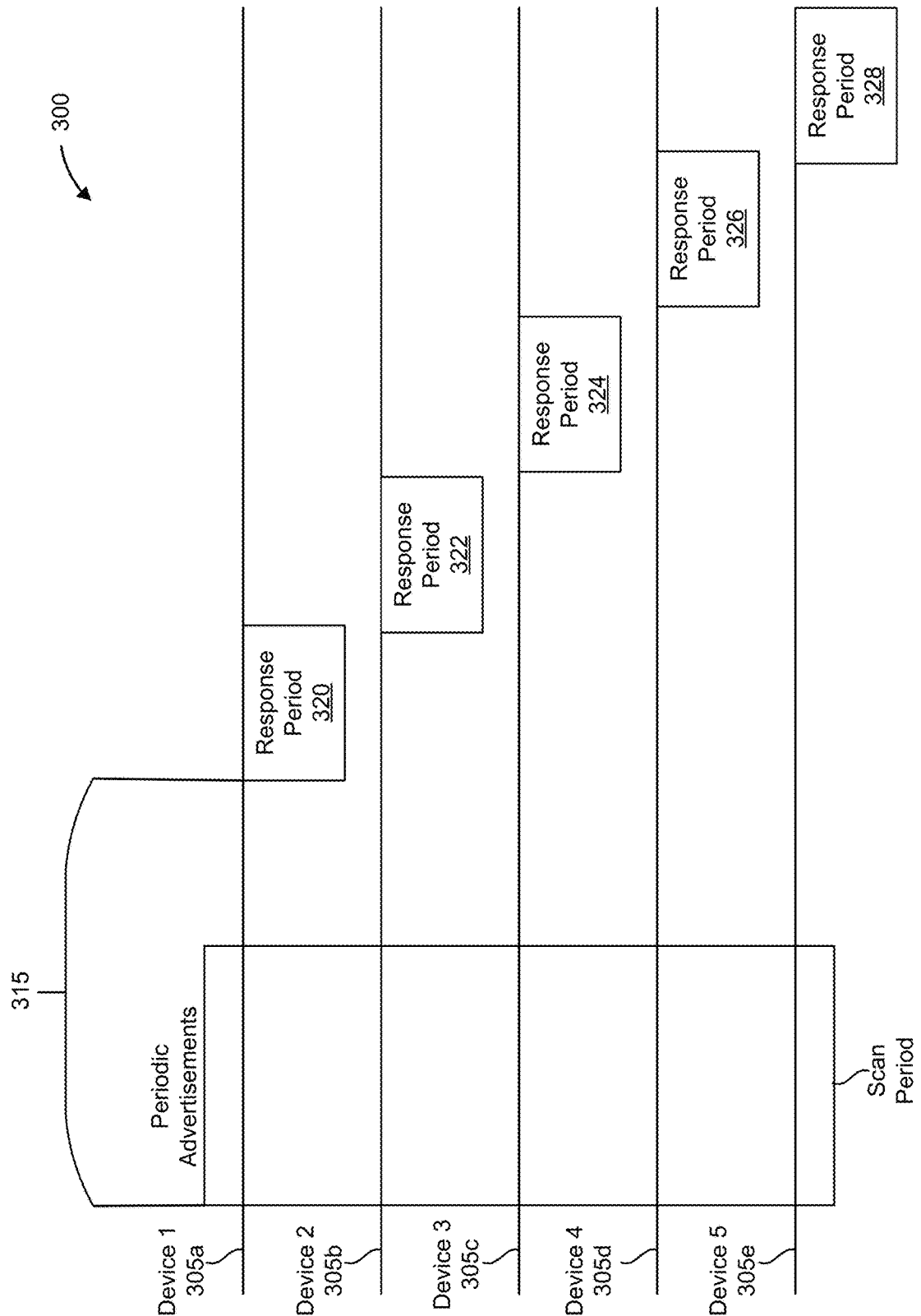
FIG. 3 is a signaling diagram illustrating example communication transmissions, in accordance with some examples.
Figure 4:
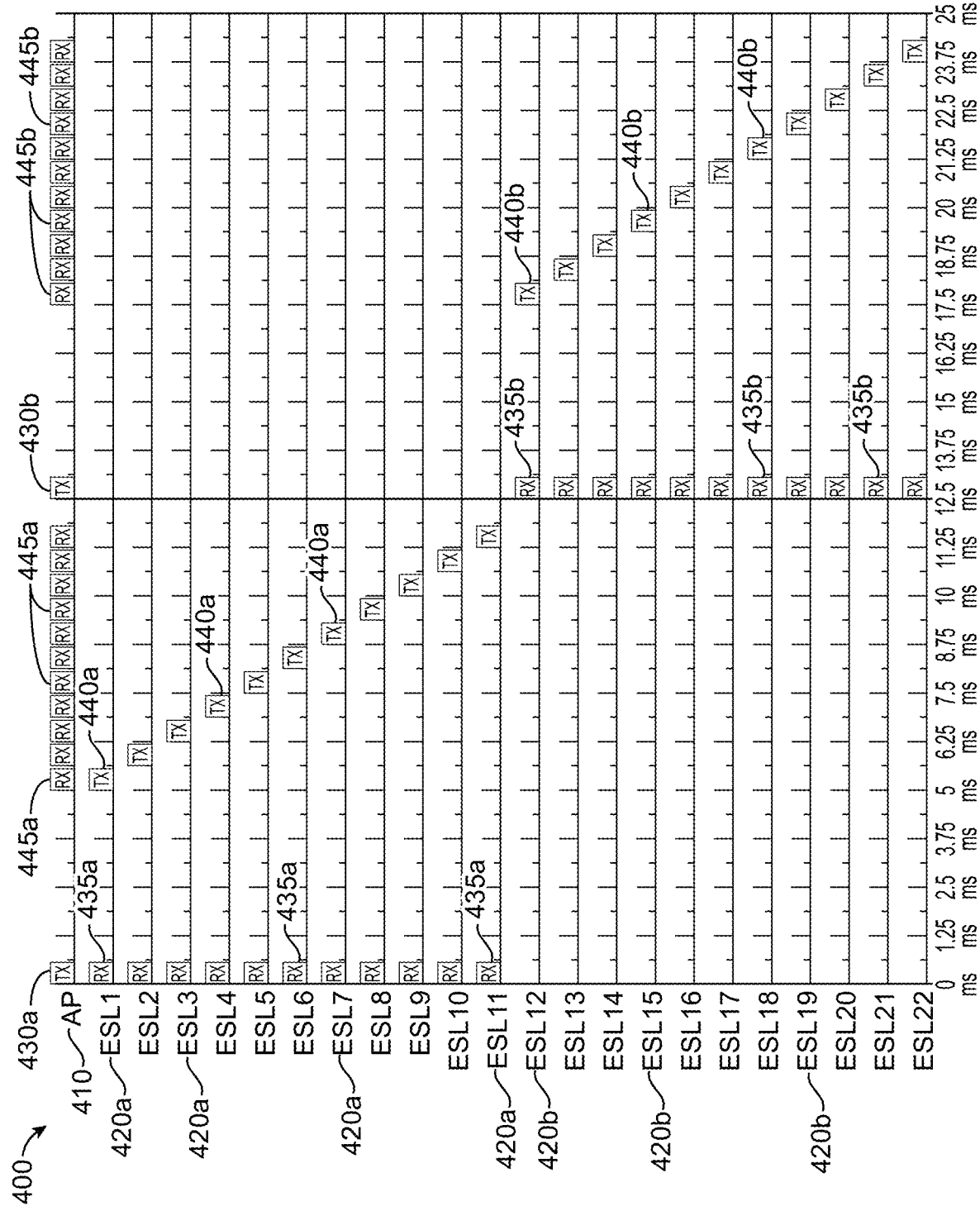
FIG. 4 is a signaling diagram illustrating an example of communication transmissions between a network device and two groups of wireless communication devices, in accordance with some examples.

FIGS. 3 and 4 show signaling diagrams illustrating examples of PAwR in an ESL system. For example, the signaling diagram of FIG. 3 illustrates an example PAwR for a group of wireless network devices (e.g., device 1 305a, device 2 305b, device 3 305c, device 4 305d, and device 5 305e), and the signaling diagram of FIG. 4 illustrates an example PAwR for two groups of wireless network devices 420a, 420b (e.g., a first group including ESL1 to ESL11, and a second group including ESL12 to ESL22). Specifically, FIG. 3 is a signal timing diagram illustrating a portion of a communication between an access point (e.g., access point 110) and wireless communication devices 120 (e.g., ESLs). With reference to FIG. 1, the signal sequence illustrated in FIG. 3 may be implemented by one or more of the communication connections, access points 110, and/or wireless communication devices 120 of FIG. 1.

The devices (e.g., device 1 305a, device 2 305b, device 3 305c, device 4 305d, and device 5 305e) of FIG. 3 may be selected from wireless communication devices 120 of FIG. 1 and may each receive a periodic advertisement (PA) in a scan period 310. The scan period 310 may occur in regularly scheduled intervals and may be repeated periodically such that the devices (e.g., device 1 305a, device 2 305b, device 3 305c, device 4 305d, and device 5 305e) can awaken to scan for messages during this repeated scan period 310. An access point (e.g., access point 110 of FIG. 1) may provide periodic advertisements (PAs) via broadcast or multi-cast to the devices (e.g., device 1 305a, device 2 305b, device 3 305c, device 4 305d, and device 5 305e) in the scan period 310. For an access point (e.g., access point 110 of FIG. 1), the scan period 310 can be its primary transmission period. In some cases, the scan period 310 may not be a fixed time because the access point (e.g., access point 110 of FIG. 1) may send different lengths of data from the start of the scan period 310.

The transmission may include multiple advertisements in a train. One or more portions of the advertisements may be directed to one or more of the devices (e.g., device 1 305*a*, device 2 305*b*, device 3 305*c*, device 4 305*d*, and device 5 305*e*). The devices (e.g., device 1 305*a*, device 2 305*b*, device 3 305*c*, device 4 305*d*, and device 5 305*e*) may decode or filter the messages intended for each specific device and transmitted during the period when all devices are receiving. In this way, the devices (e.g., device 1 305*a*, device 2 305*b*, device 3 305*c*, device 4 305*d*, and device 5 305*e*) may be reprogrammed, updated, and/or sent requests from an access point (e.g., access point 110 of FIG. 1) or relayed from another device (e.g., management entity 130 of FIG. 1) through the access point (e.g., access point 110 of FIG. 1). The periodic advertisement (PA) from the access point (e.g., access point 110 of FIG. 1) may set a response period for one or more of the devices (e.g., device 1 305*a*, device 2 305*b*, device 3 305*c*, device 4 305*d*, and device 5 305*e*).

As illustrated, the devices (e.g., device 1 305*a*, device 2 305*b*, device 3 305*c*, device 4 305*d*, and device 5 305*e*) are each assigned a response period 320, 322, 324, 326, 328 in the time after the scan period 310. In some cases, the assignment of the response period to a particular device may not be permanent. In some aspects, the assignment may be inferred from a payload of a synchronization message. The first response period 320 may begin following an idle time 315 after the scan period 310, with the idle period being long enough to provide the transmitter device an opportunity to do other Bluetooth related activities. The assigned response periods may also be limited to or designate a particular frequency of the channels on which to respond. For example, in FIG. 3, device 1 305*a* is assigned response period 320, device 2 305*b* is assigned response period 322, device 3 305*c* is assigned response period 324, device 4 305*d* is assigned response period 326, and device 5 305*e* is assigned response period 328. The access point (e.g., access point 110 of FIG. 1) may store attributes of the devices (e.g., device 1 305*a*, device 2 305*b*, device 3 305*c*, device 4 305*d*, and device 5 305*e*), including whether a device is able to transmit or respond. The PA signaling followed by responses can be referred to as periodic advertisement with multiple responses (PAwMR).

For example, device 3 305*c* (e.g., wireless communication device 120 of FIG. 1) may be an ESL and may receive a price update in a PA from the access point (e.g., access point 110 of FIG. 1) in scan period 310. The PA received at device 3 305*c* may include a designated start time for the response period 324 or may include a schedule of response start times for devices including device 3 305*c*. The response by device 3 305*c* to the access point (e.g., access point 110 of FIG. 1) may include an acknowledgement, a status code, and/or other information such as battery life, received signal strength, and/or an error notification. The response by device 3 305*c* may include information to be relayed to another device by the access point (e.g., access point 110 of FIG. 1). The response may include a packet with a header and may conform to any of the Bluetooth protocols. A response may be transmitted in a data channel of the Bluetooth protocol to the access point (e.g., access point 110 of FIG. 1). Both the PA and the responses from all of the devices (e.g., device 1 305*a*, device 2 305*b*, device 3 305*c*, device 4 305*d*, and device 5 305*e*) may use channels of the Bluetooth protocol.

A device (e.g., device 5 305*e*) that has been assigned a response period may not respond and may determine that it has nothing to signal. For example, the devices (e.g., device 1 305*a*, device 2 305*b*, device 3 305*c*, device 4 305*d*, and device 5 305*e*) may determine what response, if any, is required and may or may not respond to a request sent from the access point (e.g., access point 110 of FIG. 1). The response periods 320, 322, 324, 326, 328 may be assigned based on a request for such a period in an open transmission time, the request being sent to the access point (e.g., access point 110 of FIG. 1). The response periods 320, 322, 324, 326, 328 may be assigned based on which devices have been requested by the access point (e.g., access point 110 of FIG. 1) to send data or acknowledgements. The PA messages and responses may be frequency-hopped, time synchronized channels, and/or extended channels of the advertising channels in Bluetooth.

As previously mentioned, FIG. 4 shows an example PAwR for two groups of wireless network devices 420*a*, 420*b* (e.g., a first group including ESL1 to ESL11, and a second group including ESL12 to ESL22). In particular, FIG. 4 is a signaling diagram illustrating an example of communication transmissions 400 between a network device 410 (e.g., a central device, which may be an access point) and two groups of wireless communication devices 420*a*, 420*b* (e.g., peripheral devices, which may be ESLs). With reference to FIG. 1, the signal sequence illustrated in FIG. 4 may be implemented by one or more of the communication connections, access points 110, and/or wireless communication devices 120 of FIG. 1.

In FIG. 4, the signaling diagram is shown in the form of a graph with an x-axis denoting time in milliseconds (ms) and a y-axis denoting specific wireless communication devices 420*a*, 420*b* (e.g., ESL1, ESL2, ESL3, ESL4, ESL5, ESL6, ESL7, ESL8, ESL9, ESL10, ESL11, ESL12, ESL13, ESL14, ESL15, ESL16, ESL17, ESL18, ESL19, ESL20, ESL21, and ESL22). In particular, the x-axis of the graph of FIG. 4 denotes time starting from 0 ms and ending at 25 ms. The time can be divided into two subframes, which are each a length of 12.5 ms. As such, the two subframes may include a first subframe from 0 ms to 12.5 ms, and a second subframe from 12.5 ms to 25 ms. In one or more examples, there may be more or less than two subframes as is shown in FIG. 4, and/or each subframe may be longer or shorter than 12.5 ms as shown in FIG. 4.

In one or more examples, the wireless communication devices 420*a*, 420*b* (e.g., peripheral devices) may be assigned (e.g., by the network device 410 and/or by a network entity, such as a management entity) to different groups (e.g., two groups) of wireless communication devices 420*a*, 420*b*. For example, wireless communication devices 420*a* (e.g., ESL1, ESL2, ESL3, ESL4, ESL5, ESL6, ESL7, ESL8, ESL9, ESL10, and ESL11) may be assigned to a first group (e.g., group 1), and wireless communication devices 420*b* (e.g., ESL12, ESL13, ESL14, ESL15, ESL16, ESL17, ESL18, ESL19, ESL20, ESL21, and ESL22) may be assigned to second group (e.g., group 2).

In FIG. 4, during operation for PAwR, at time 0 ms for the first subframe of time, the network device 410 (e.g., a central, such as an AP) may transmit 430*a* to a first group (e.g., group 1) of wireless communication devices 420*a* (e.g., ESL1, ESL2, ESL3, ESL4, ESL5, ESL6, ESL7, ESL8, ESL9, ESL10, and ESL11) a PA containing a synchronization message (e.g., an AP synchronization message) over a synchronized channel between the network device 410 and the wireless communication devices 420*a*, 420*b*. As noted previously, a synchronization message can include one or more commands. For instance, a command can include an operational code (OpCode) and parameters associated with the command. At time 0 ms, the first group of wireless communication devices 420*a* (e.g., ESL1, ESL2, ESL3, ESL4, ESL5, ESL6, ESL7, ESL8, ESL9, ESL10, and ESL11) can receive 435a the PA containing the synchronization message over the synchronized channel.

In one or more examples, the network device 410 may be configured to transmit PAs at a specified time interval (e.g., a subframe of time), such as at every 12.5 ms as is shown in FIG. 4. In one or more examples, the specified time interval (e.g., a subframe) may be shorter or longer than the 12.5 ms as is shown in FIG. 4. The wireless communication devices 420a, 420b may respond to a PA by using their specific respective response slot in time.

In one or more examples, the synchronization message transmitted 430a to the first group (e.g., group 1) of wireless communication devices 420a (e.g., ESL1, ESL2, ESL3, ESL4, ESL5, ESL6, ESL7, ESL8, ESL9, ESL10, and ESL11) may indicate a respective response slot for one or more of the wireless communication devices 420a (e.g., ESL1, ESL2, ESL3, ESL4, ESL5, ESL6, ESL7, ESL8, ESL9, ESL10, and/or ESL11) in the first group to use to transmit 440a a response to the network device 410. If a wireless communication device 420a (e.g., ESL1, ESL2, ESL3, ESL4, ESL5, ESL6, ESL7, ESL8, ESL9, ESL10, and ESL11) is addressed within the synchronization message, the wireless communication device 420a (e.g., ESL1, ESL2, ESL3, ESL4, ESL5, ESL6, ESL7, ESL8, ESL9, ESL10, and ESL11) can respond (e.g., transmit 440a) in its respective response slot, as indicated within the synchronization message.

For example, the synchronization message may indicate a specific sequence for one or more of the wireless communication devices 420a (e.g., ESL1, ESL2, ESL3, ESL4, ESL5, ESL6, ESL7, ESL8, ESL9, ESL10, and/or ESL11) to respond (e.g., transmit 440a) in time (e.g., responding after 5 ms has elapsed after the start of the subframe at response slots located every 0.625 ms). For example, the sequence may indicate that wireless communication device 420a (e.g., ESL1) should respond in a response slot located at 5 ms, wireless communication device 420a (e.g., ESL2) should respond in a response slot located at 5.625 ms, wireless communication device 420a (e.g., ESL3) should respond in a response slot located at 6.25 ms, wireless communication device 420a (e.g., ESL4) should respond in a response slot located at 6.875 ms, wireless communication device 420a (e.g., ESL5) should respond in a response slot located at 7.5 ms, wireless communication device 420a (e.g., ESL6) should respond in a response slot located at 8.125 ms, wireless communication device 420a (e.g., ESL7) should respond in a response slot located at 8.75 ms, wireless communication device 420a (e.g., ESL8) should respond in a response slot located at 9.375 ms, wireless communication device 420a (e.g., ESL9) should respond in a response slot located at 10 ms, wireless communication device 420a (e.g., ESL10) should respond in a response slot located at 10.625 ms, and wireless communication device 420a (e.g., ESL11) should respond in a response slot located at 11.25 ms.

After the wireless communication devices 420a (e.g., ESL1, ESL2, ESL3, ESL4, ESL5, ESL6, ESL7, ESL8, ESL9, ESL10, and ESL11) have received 435a the PA containing the synchronization message from the network device 410, according to the sequence specified within the synchronization message, the one or more wireless communication devices 420a (e.g., ESL1, ESL2, ESL3, ESL4, ESL5, ESL6, ESL7, ESL8, ESL9, ESL10, and/or ESL11) can transmit 440a their responses within their respective response slots. After the one or more wireless communication devices 420a (e.g., ESL1, ESL2, ESL3, ESL4, ESL5, ESL6, ESL7, ESL8, ESL9, ESL10, and/or ESL11) have transmitted 440a their responses in their respective time slots, the network device 410 can receive 445a their transmitted responses at those specific response slot times.

Then, during operation for PAwR, at time 12.5 ms for the second subframe of time, the network device 410 may transmit 430b to a second group (e.g., group 2) of wireless communication devices 420b (e.g., ESL12, ESL13, ESL14, ESL15, ESL16, ESL17, ESL18, ESL19, ESL20, ESL21, and ESL22) a PA containing a synchronization message over a synchronized channel between the network device 410 and the wireless communication devices 420a, 420b. In addition, at time 12.5 ms, the second group of wireless communication devices 420b (e.g., ESL12, ESL13, ESL14, ESL15, ESL16, ESL17, ESL18, ESL19, ESL20, ESL21, and ESL22) can receive 435b the PA containing the synchronization message over the synchronized channel.

The synchronization message transmitted 430b to the second group (e.g., group 2) of wireless communication devices 420b (e.g., ESL12, ESL13, ESL14, ESL15, ESL16, ESL17, ESL18, ESL19, ESL20, ESL21, and ESL22) may indicate a respective response slot for one or more of the wireless communication devices 420b (e.g., ESL12, ESL13, ESL14, ESL15, ESL16, ESL17, ESL18, ESL19, ESL20, ESL21, and/or ESL22) in the second group to use to transmit 440b a response to the network device 410. If a wireless communication device 420b (e.g., ESL12, ESL13, ESL14, ESL15, ESL16, ESL17, ESL18, ESL19, ESL20, ESL21, and ESL22) is addressed within the synchronization message, the wireless communication device 420b (e.g., ESL12, ESL 13, ESL14, ESL15, ESL16, ESL17, ESL18, ESL19, ESL20, ESL21, and ESL22) can respond (e.g., transmit 440b) in its respective response slot, as indicated within the synchronization message.

For example, the synchronization message may indicate a specific sequence for one or more of the wireless communication devices 420b (e.g., ESL12, ESL13, ESL14, ESL15, ESL16, ESL17, ESL18, ESL19, ESL20, ESL21, and/or ESL22) to respond (e.g., transmit 440b) in time (e.g., responding after 5 ms has elapsed after the start of the subframe at response slots located every 0.625 ms). For example, the sequence may indicate that wireless communication device 420b (e.g., ESL12) should respond in a response slot located at 17.5 ms, wireless communication device 420b (e.g., ESL13) should respond in a response slot located at 18.125 ms, wireless communication device 420b (e.g., ESL14) should respond in a response slot located at 18.75 ms, wireless communication device 420b (e.g., ESL15) should respond in a response slot located at 19.375 ms, wireless communication device 420b (e.g., ESL16) should respond in a response slot located at 20 ms, wireless communication device 420b (e.g., ESL17) should respond in a response slot located at 20.625 ms, wireless communication device 420b (e.g., ESL18) should respond in a response slot located at 21.25 ms, wireless communication device 420b (e.g., ESL19) should respond in a response slot located at 21.875 ms, wireless communication device 420b (e.g., ESL20) should respond in a response slot located at 22.5 ms, wireless communication device 420b (e.g., ESL21) should respond in a response slot located at 23.125 ms, and wireless communication device 420b (e.g., ESL22) should respond in a response slot located at 23.75 ms.

After the wireless communication devices 420b (e.g., ESL12, ESL13, ESL14, ESL15, ESL16, ESL17, ESL18, ESL19, ESL20, ESL21, and ESL22) have received 435b the PA containing the synchronization message from the network device 410, according to the sequence specified within the synchronization message, the one or more wireless communication devices 420b (e.g., ESL12, ESL13, ESL14, ESL15, ESL16, ESL17, ESL18, ESL19, ESL20, ESL21, and/or ESL22) may transmit 440b their responses within their respective response slots. After the one or more wireless communication devices 420b (e.g., ESL12, ESL13, ESL14, ESL15, ESL16, ESL17, ESL18, ESL19, ESL20, ESL21, and/or ESL22) have transmitted 440b their responses in their respective time slots, the network device 410 can receive 445b their transmitted responses at those specific response slot times. Then, the PAwR may continue similarly for subsequent subframes of time.

As previously noted, each access point (e.g., master device) may have an associated channel map. A channel map is a listing of frequency channels to be utilized or, conversely, not to be utilized (e.g., in the context of modification of frequency hopping sequences) by an access point for communication, such as with the ESLs or other devices. The channel map of an access point can be updated via a channel map update (CMU). A CMU is a procedure for updating (or changing) a current channel map (ChM) for an access point to a new channel map for the access point. During a CMU, an access point can transmit synchronization messages to the ESLs to notify the ESLs of the new channel map to be used for future communications with the access point.

In an ESL system, an access point (e.g., master device) may transmit synchronization messages carried in an AUX_SYNC_IND (e.g., an auxiliary synchronization indication) on periodic physical channels. In some cases, to coexist with a wireless local area network (WLAN) or to avoid noisy channels, the access point (e.g., master device) may need to change the channel map. The access point (e.g., master device) may change the channel map by performing a CMU by using a CMU indication, which can be carried in the ACAD field of AUX_SYNC_IND. AUX_SYNC_IND may contain a channel map (ChM) field, which contains the future channel map (e.g., the new channel map) the PA train will switch to, and an Instant field, which is a future time (e.g., for a PeriodicEventCounter, which is the event counter for a PA train) that the access point will switch to using the future channel map (e.g., the new channel map). To ensure that an ESL (e.g., slave device) can receive the CMU information successfully, the access point (e.g., master device) can sends the AUX_SYNC_IND+CMU at least a certain number of times (e.g., at least six (6) times) per each group of ESLs (e.g., 6*128 groups of ESLs for PAwR).

In some examples, ESL devices and/or ESL systems can perform angle of arrival (AoA)-based location determination based on a constant tone extension (CTE) field that is appended to another transmission (e.g., as described previously). For example, a CTE can be appended to an existing transmission, such as a PA. A periodic advertisement that includes a CTE may also be referred to herein as a PA CTE. Some AoA-based location determination tasks performed by an ESL device and/or an ESL system may be based receiving multiple PA CTEs (e.g., multiple PAs each including a CTE field) from multiple PA transmitters. For instance, ESL-based AoA location determination performed for triangulation, static, and/or moving use cases may require an ESL (e.g., configured as an AoA receiver) to measure PA CTEs from multiple different PA transmitters.

As noted previously, the systems and techniques described herein that can be used to perform location determination based on PA synchronization. For example, the systems and techniques can be used to perform AoA-based location determination based on PA synchronization. In some examples, AoA-based location determination can be performed using one or more wireless communication devices (e.g., such as an electronic shelf label (ESL) or other peripheral device). In some cases, the PA synchronization can be performed using an access point (AP) synchronization system. The AP synchronization system may be included in or provided as an ESL system, as will be described in greater depth below.

Figure 5:
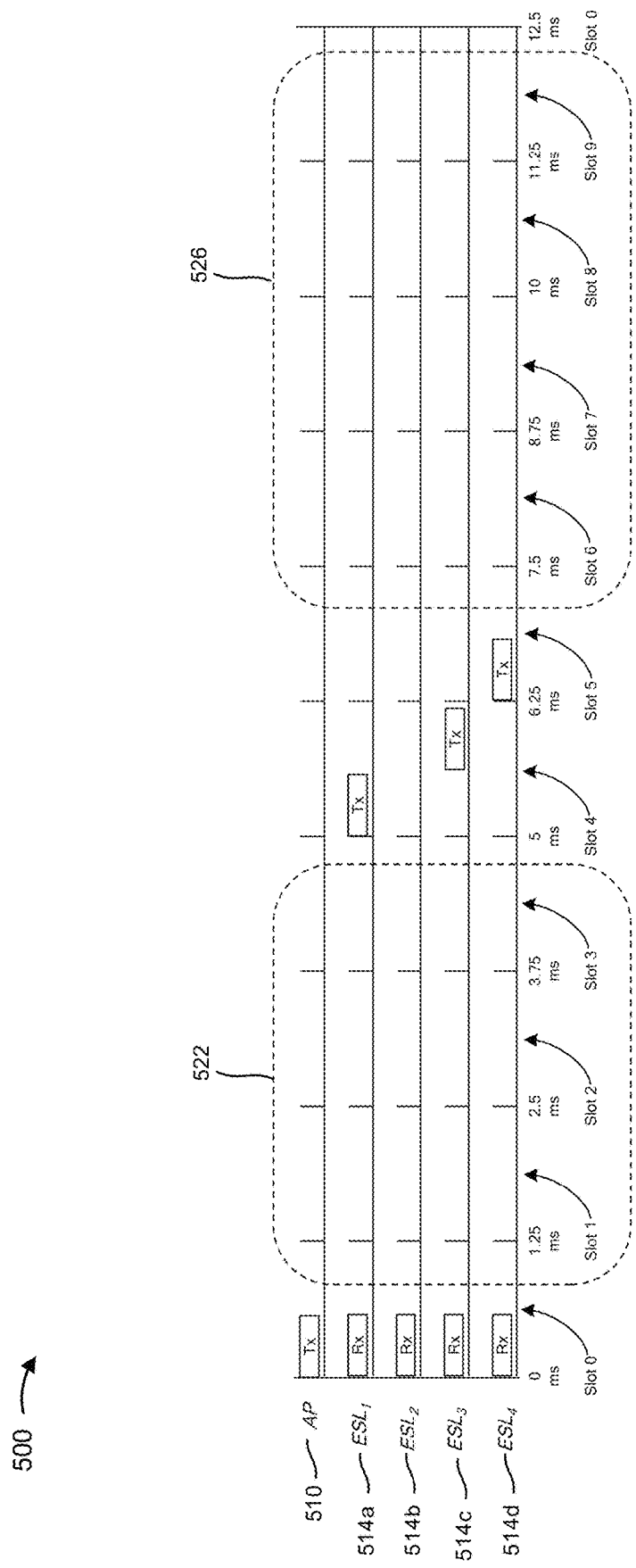
FIG. 5 is a signaling diagram illustrating an example of periodic advertisement (PA) constant tone extension (CTE) transmissions using a periodic advertisement with response (PAwR) subframe, in accordance with some examples.

FIG. 5 is a signaling diagram illustrating an example of periodic advertisement (PA) constant tone extension (CTE) transmissions in a PA subframe 500, in accordance with some examples. An AP 510 can be associated with a plurality of wireless communication devices, such as electronic shelf label (ESL) devices (e.g., also referred to herein as "ESLs"). For instance, AP 510 can be associated with a first ESL 514a (e.g., $ESL_1$), a second ESL 514b (e.g., $ESL_2$), a third ESL 514c (e.g., $ESL_3$), and a fourth ESL 514d (e.g., $ESL_4$). In some aspects, the ESLs 514a-514d may be the same or similar to one another. The ESLs 514a-514d (e.g., collectively referred to as ESLs 514) can be included in the same group that is associated with AP 510. For example, each of the ESLs 514 may have the same group identifier, wherein the group identifier is associated with AP 510.

In some aspects, the PA CTE transmissions can be provided on a PA subframe 500 that has a duration (e.g., a PA interval) of 12.5 ms, as described above with respect to FIG. 4. In one illustrative example, the PA subframe 500 can include one or subframe slots. For example, the PA subframe 500 may include 10 slots each having a time duration of 1.25 ms (e.g., the PA interval of 12.5 ms divided by the 10 slots).

The PA subframe 500 can be a PAwR subframe associated with AP 510 and/or associated with one or more PAwR transmissions of AP 510. For example, at Slot 0, AP 510 can generate and transmit a PAwR transmission (e.g., shown as "Tx" in Slot 0). Based on the association between the plurality of ESLs 514 and the AP 510, each of the ESLs 514a-514d may receive the PAwR transmission from AP 510 (e.g., shown as the respective "Rx" in Slot 0 for each of the ESLs 514a-514d). In one illustrative example, the ESLs 514 may receive the PAwR transmission at the same time within Slot 0. For instance, the PAwR transmission can include synchronization information of the AP 510, wherein the ESLs 514 can use the synchronization information to establish synchronization with AP 510 and/or to re-establish synchronization with AP 510 (e.g., compensate for time drift since a last synchronization event or since last receiving the synchronization information).

In one illustrative example, the PAwR transmission generated and transmitted by AP 510 in Slot 0 can be an AP_SYNC packet. In some cases, the AP_SYNC PAwR transmission can be transmitted at a time that is aligned with the beginning of the PAwR subframe 500. For example, AP 510 can transmit or broadcast the AP_SYNC packet at the beginning of Slot 0 (e.g., which can be the same as the beginning of the PAwR subframe 500). Based on receiving the AP_SYNC packet (or other PAwR transmission) from AP 510 in Slot 0, one or more of the ESLs 514 may generate and transmit a response packet at a later time (e.g., using one of the subsequent Slots 1-9 included in the same PAwR subframe 500 as the AP_SYNC packet). In some cases, the ESLs 514 may transmit response packets at a pre-determined offset relative to the AP_SYNC packet. For instance, the pre-determined offset can be indicated by the synchronization information included in the AP_SYNC packet. The synchronization information of the AP_SYNC packet may also include one or more device identifiers indicative of the particular ESLs 514 from which AP 510 expects or requests a response.

As illustrated in FIG. 5, the first ESL 514a, third ESL 514c, and fourth ESL 514d generate and transmit a PAwR transmission (e.g., a response packet) based on receiving the PAwR transmission (e.g., an AP_SYNC packet) from AP 510 in Slot 0. The PAwR transmissions from the ESLs 514 may be transmitted within one or more pre-determined time slots of the PAwR subframe 500. For instance, the three ESL PAwR response transmissions can be transmitted in Slots 4 and 5 of the PAwR subframe 500.

Each ESL PAwR response transmission can be transmitted using a particular ESL Response Slot (e.g., using a particular ERP slot). For example, ESL 514a can transmit a PAwR response using a first ERP slot, that is included within PAwR subframe 500 Slot 4; ESL 514c can transmit a PAwR response using a second ERP slot, that is included within PAwR subframe 500 Slot 4 and ESL 514d can transmit a PAwR response using a third ERP slot, that is included within PAwR subframe 500 Slot 5. ERP slots may be different than the time slots of the PAwR subframe 500. For example, the PAwR subframe 500 may include 10 time slots and 11 ESL response slots (e.g., ERPs). The 10 PAwR time slots may each be 1.25 ms in duration, while the 11 ESL response slots may each be 0.625 ms in duration. Each ESL response slot may additionally be associated with a start time that begins 5 ms from the edge of the PAwR subframe 500 (e.g., the ESL response slots may all have start times that begin no earlier than within the PAwR Slot 4 shown in FIG. 5). In some aspects, the 11 ESL response slots can overlap with or be included in various ones of the PAwR Slots 4-9.

In one illustrative example, the systems and techniques described herein can be used to transmit (and receive) one or more PA CTEs for AoA-based location determination, wherein the PA CTEs are transmitted on a subframe that is shared with one or additional PA transmissions and/or PA trains. For instance, the systems and techniques can be used to transmit one or more AoA PA CTEs within the PAwR subframe 500 of FIG. 5. In some aspects, the AoA PA CTEs can be transmitted based on a time synchronization between one or more (or all) of the AP 510 and the ESLs 514. For example, based on the time synchronization, the AoA PA CTEs can be transmitted in PAwR time slots (e.g., Slots 0-9) that are not associated with or reserved for PAwR response transmissions.

For example, the PAwR time slots 4 and 5 can be reserved for PAwR response transmissions that are (or may be) transmitted by the ESLs 514, and the systems and techniques can be used to transmit and receive PA CTEs using one or more (or all) of the remaining PAwR time slots. For example, the PA CTEs may be transmitted and received using one or more of the time slots included in a first group 522 and/or using one or more of the time slots included in a second group 526. In some aspects, a plurality of PA CTEs can be transmitted and/or received in a same PAwR time slot. For example, a given PAwR time slot can include a plurality of sub-divisions, wherein each PA CTE of the multiple PA CTEs transmitted/received in the PAwR time slot utilizes a different sub-division.

In one illustrative example, the PA CTEs for AoA-based location determination can be scheduled onto multiple PA trains. For example, each AoA Tx ESL and each AoA Rx ESL can form a respective PA train. In some aspects, the PA trains associated with the PA CTEs for AoA-based location determination using the ESLs can be synchronized between the ESLs based on using a timing reference. For instance, the timing reference can be a reference starting time at which each Tx and Rx ESL begins transmitting or receiving, respectively, the PA CTEs. The timing reference may additionally, or alternatively, be provided as a network entity (e.g., AP 510) that is associated with each of the ESLs and can be used to provide or determine the reference starting time to each ESL.

In some examples, the systems and techniques can utilize synchronization information to determine the PA CTE reference starting time for the ESLs and to avoid collisions or conflicts with PAwR transmission on the same PAwR subframe 500. For example, the synchronization information can be used to start the respective PA train(s) associated with the ESLs and the AoA-based location determination at a shared reference time and may additionally be used to schedule the PA CTE transmissions (e.g., on the respective PA train(s)) to avoid conflicts or collisions with PAwR transmissions in the same PAwR subframe 500, as will be described in greater depth below.

Figure 6:
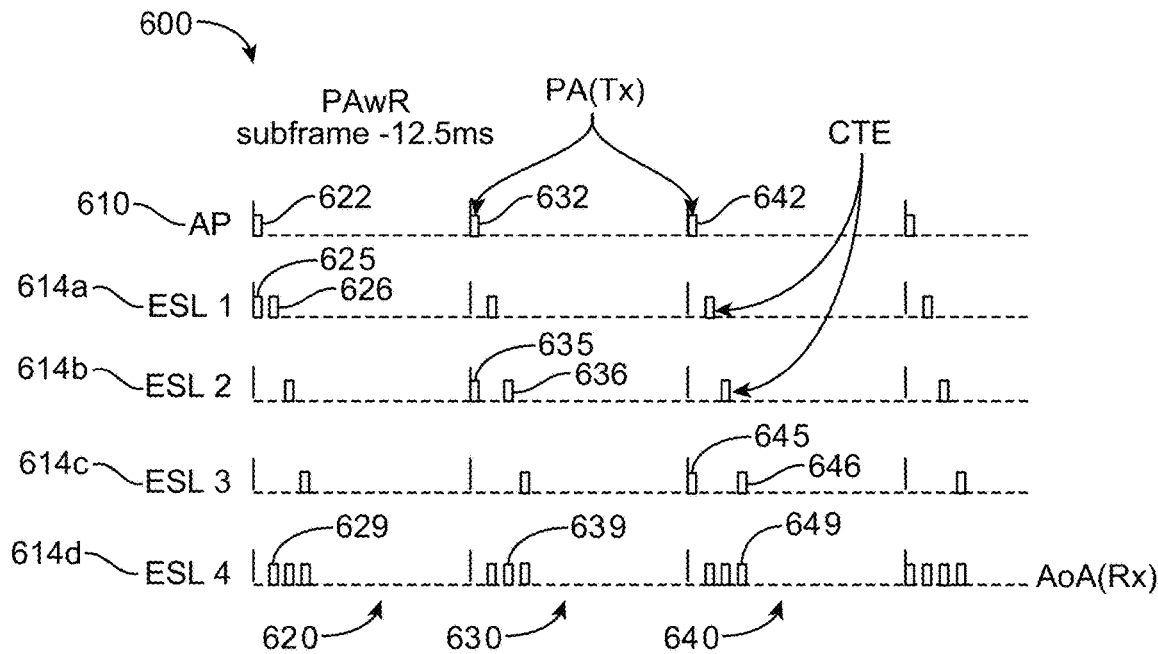
FIG. 6 is a signaling diagram illustrating an example of steady-state PA CTE transmissions between a time synchronized network device and a plurality of wireless communication devices, in accordance with some examples.

FIG. 6 is a signaling diagram 600 illustrating an example of a plurality of time synchronized PA CTE transmissions using PA subframes between a time synchronized network device and a plurality of wireless communication devices, in accordance with some examples. In one illustrative example, the network device can be an AP 610 and the plurality of wireless communication devices can include the ESLs 614a-614d. The PA CTE transmissions can be scheduled and/or synchronized based on using time synchronization information associated with the AP 610 and the ESLs 614a-614d as a common or shared time reference.

For instance, the PA CTEs can be transmitted and received using a plurality of PA subframes, including a first PA subframe 620, a second PA subframe 630, a third PA subframe 640, etc. The PA subframes 620-640 can be PAwR subframes that are the same as or similar to the PAwR subframe 500 of FIG. 5. For example, the PA subframes 620-640 may each have a duration of 12.5 ms. In some aspects, the PA subframes 620-640 can be included in a plurality of PA subframes of a PA frame. For example, a PA frame may include 128 PA subframes each having a duration of 12.5 ms, such that the PA frame has a duration of 128*12.5 ms=1.6 s.

The PA subframe duration of 12.5 ms can be the same as a PA subevent interval. For example, a PAwR transmission can be generated and transmitted (e.g., by AP 610) using the 12.5 ms subevent interval (e.g., a PAwR transmission can be transmitted by AP 610 in each of the PA subframes). For instance, the first PA subframe (e.g., PAwR subframe) 620 can be associated with a first PAwR transmission 622, the second PA subframe (e.g., PAwR subframe) 630 can be associated with a second PAwR transmission 632, the third PA subframe (e.g., PAwR subframe) 640 can be associated with a third PAwR transmission 642, etc.

In one illustrative example, the PAwR transmission in each PA subframe (e.g., the PAwR transmissions 622, 632, 642) can be a synchronization message or can include synchronization information. For instance, the PAwR transmissions can be AP_SYNC packets transmitted to the ESLs 614 by AP 610. In some cases, AP 610 can generate and transmit an AP_SYNC packet at the beginning of each PA subframe (e.g., 620, 630, 640). Based on receiving the AP_SYNC packet in each PA subframe, the ESLs 614 can perform and/or maintain time synchronization with the AP 610.

To perform AoA-based location determination, the systems and techniques can determine synchronization information for forming one or more PA trains associated with the ESLs 614 and used to transmit/receive a plurality of PA CTEs. For example, the PA CTE trains can be formed (e.g., started) at a starting time that is a fixed or pre-determined offset away from the existing PAwR transmissions associated with the plurality of PA subframes 620, 630, 640.

For example, the first ESL 614a can be scheduled to transmit a first PA CTE transmission 626 at a starting time within PA subframe 620 that is a fixed offset away from the PAwR reception slot 625 that is also within PA subframe 620. The PAwR reception slot 625 can be used by the first ESL 614a to receive the AP_SYNC packet 622 transmitted by AP 610. In some aspects, the transmission start time associated with the first PA CTE transmission 626 can be determined relative to the PAwR start time (e.g., the starting transmit time of AP_SYNC 622 and/or the starting receive time of PAwR reception slot 625). For instance, the transmission start time associated with the first PA CTE transmission 626 can be a fixed time offset away from the beginning of the PA subframe 620 (e.g., based on the AP_SYNC being transmitted and received at the beginning of PA subframe 620). In some examples, the same fixed time offset can be used by first ESL 614a to generate and transmit a PA CTE transmission in each of the PA subframes 620, 630, 640. In such examples, the interval between consecutive PA CTEs transmitted by first ESL 614a can be the same as the interval between consecutive PA subframes. For instance, the interval between consecutive PA CTEs transmitted by respective ones of the ESLs 614a-614d can be 12.5 ms.

The second ESL 614b is shown as receiving an AP_SYNC (or other PAwR transmission) packet 632 at the beginning of PA subframe 630, using a corresponding PAwR reception slot 635. The AP_SYNC 632 and PAwR reception slot 635 can both be aligned with the edge (e.g., beginning) of PA subframe 630. The second ESL 614b can generate and transmit a PA CTE 636 using a fixed time offset from the PAwR train. The time offset associated with the PA CTE 636 transmitted by second ESL 614b can be different than the time offset associated with the PA CTE 626 transmitted by first ESL 614a. For instance, the second ESL 614b can transmit the PA CTE 636 using a greater time offset from the beginning of PA subframe 630, such that the PA CTE 636 is transmitted after both the AP_SYNC 632 and the PA CTE transmitted by the first ESL 614a (e.g., such as the PA CTE 626 transmitted using a first time offset from the PAwR train).

Similarly, the third ESL 614c is shown a receiving an AP_SYNC 642 at the beginning of PA subframe 640, using a corresponding PAwR reception slot 645. The AP_SYNC 642 and PAwR reception slot 645 can both be aligned with the edge (e.g., beginning) of PA subframe 640. The third ESL 614c can generate and transmit a PA CTE 646 using a fixed time offset from the PAwR train. The time offset used to transmit PA CTE 646 can be different (e.g., greater) than the time offset used to transmit PA CTE 636 and can be different (e.g., greater) than the time offset used to transmit PA CTE 626.

In some aspects, the first three ESLs 614a-614c can be configured as Tx ESLs for transmitting AoA PA CTEs for the AoA-based location determination described herein. For instance, the three ESLs 614a-614c can generate and transmit PA CTEs that are time synchronized and do not conflict with one another and further do not conflict with existing PAs on the PAwR train associated with the PA subframes 620, 630, 640.

The fourth ESL 614d can be configured as an Rx ESL for receiving the AoA PA CTEs transmitted by the Tx ESLs 614a-614c. For example, each Tx ESL 614a-614c may transmit a respective PA CTE at a scheduled time within each of the PAwR subframes 620, 630, 640. The Rx ESL 614d can receive each of the respective PA CTEs at corresponding scheduled times within each of the PAwR subframes. For instance, the three AoA Tx ESLs 614a-c can each transmit one PA CTE per PAwR subframe (e.g., in the example illustrated in FIG. 6), and the AoA Rx ESL 614d can receive a total of three PA CTEs per PAwR subframe. Based on AoA information or measurements determined from the PA CTEs received at AoA Rx ESL 614d, one or more location determinations can be generated.

In one illustrative example, each ESL 614a-d can be associated with a respective PA train for transmitting or receiving the PA CTEs. The PA train(s) used to transmit and receive the PA CTEs can be different than the PAwR train used to transmit and receive AP_SYNC packets and PAwR responses. For instance, the AP_SYNC packets 622, 632, 642 and corresponding PAwR reception slots 625, 635, 645 can be associated with a PAwR train of AP 610, and each PA CTE can be transmitted and/or received using a PA CTE train that is different than the PAwR train of AP 610.

In some aspects, each ESL may be associated with its own PA CTE train. For example, first ESL 614a can jump into or form a first PA CTE train that is used to transmit the first PA CTEs 626; the second ESL 614b can jump into or form a second PA CTE train that is used to transmit the second PA CTEs 636; the third ESL 614c can jump into or form a third PA CTE train that is used to transmit the third PA CTEs 646; etc. In some aspects, the fourth ESL 614d (e.g., the AoA Rx ESL) can additionally, or alternatively, utilize its own PA CTE train to receive the plurality of PA CTEs transmitted by the AoA Tx ESLs 614a-c. In some aspects, the AoA Rx ESL 614d can track each of the independent PA CTE trains associated with the respective AoA Tx ESLs 614a-c, for example based on the PA CTE trains associated with the AoA Tx ESLs 614a-c being independent but non-overlapping in time. By tracking each of the independent and non-overlapping PA CTE trains used to transmit the plurality of PA CTEs, the AoA Rx ESL 614d can receive at least one PA CTE transmission from each AoA Tx ESL in each PAwR subframe (e.g., 620, 630, 640).

Figure 7:
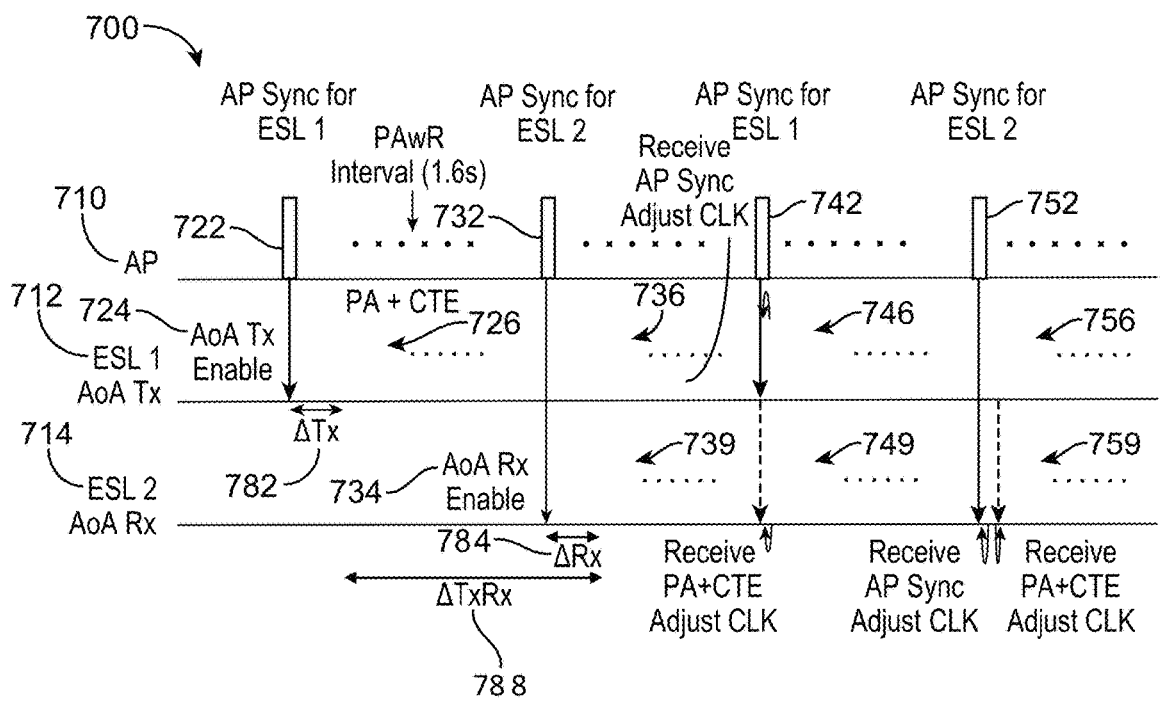
FIG. 7 is a signaling diagram illustrating an example of establishment of time synchronized PA CTE transmissions between a network device and a plurality of wireless communication devices, in accordance with some examples.

In some aspects, the example of FIG. 6 depicts a steady state operation of an ESL system that includes the AP 610 and the ESLs 614a-d, wherein time synchronization has already been established for scheduling and synchronizing the transmission and reception of the PA CTEs. FIG. 7 is a signaling diagram illustrating an example of establishment of a plurality of time synchronized PA CTEs using PA subframes between a time synchronized network device and a plurality of wireless communication devices, in accordance with some examples. In one illustrative example, the network device can be an AP 710. The plurality of wireless communication devices can include an AoA Tx ESL 712 used to transmit one or more PA CTEs for AoA-based location determination, and can include an AoA Rx ESL 714 used to receive one or more PA CTEs for AoA-based location determination. For instance, the AoA Tx ESL 712 can generate and transmit PA CTEs that are received by the AoA Rx ESL 714. In some aspects, the AP 710 can be the same as or similar to the AP 610 illustrated in FIG. 6, the AoA Tx ESL 712 can be the same as or similar to one or more of the AoA Tx ESLs 614a-c illustrated in FIG. 6, and/or the AoA Rx ESL 714 can be the same as or similar to the AoA Rx ESL 614d illustrated in FIG. 6.

In one illustrative example, initial time synchronization can be performed using one or more AP_SYNC packets transmitted by AP 710. For instance, AP 710 can generate and transmit respective AP_SYNC packets to the PA CTE transmit-side devices (e.g., AoA Tx ESL 712) and to the PA CTE receive-side devices (e.g., AoA Rx ESL 714). As illustrated, AP 710 can generate and transmit an AP_SYNC packet 722 for ESL1 and can generate and transmit an AP_SYNC packet 732 for ESL2.

The AP_SYNC packets 722 and 732 can include synchronization information that may be used by the respective ESLs 712 and 714 to determine a reference time (e.g., a start time) for forming or otherwise jumping onto one or more PA CTE trains. For instance, the AP_SYNC 722 for ESL1 can be used to determine a reference time and/or start time for forming a PA CTE train for a plurality of PA CTE transmissions by the AoA Tx ESL 712. The AP_SYNC 724 for ESL2 can be used to determine a reference time and/or start time for jumping to or joining the ESL1 PA CTE train, to thereby receive at the AoA Rx ESL 714 the plurality of PA CTE transmissions from the AoA Tx ESL 712.

In some aspects, the AoA Rx ESL 714 can jump directly to the ESL1 PA CTE train, for instance based on determining timing information included in or indicated by the AP_SYNC 732. In one illustrative example, the AP_SYNC 722 and 732 can include or otherwise be indicative of a first timing information and a second timing information.

For instance, the first timing information can be timing information associated with AP 710 and/or associated with the PAwR subframe in which the PA CTEs are transmitted. In one illustrative example, the first timing information can include shared or common time reference information, for example indicative of syncInfo of a PAwR train in the PAwR subframe.

The second timing information can be timing information associated with the Tx and Rx ESLs used to perform AoA-based location determination. For example, the second timing information can be timing information associated with the AoA Tx ESL 712 and/or the AoA Rx ESL 714. In some aspects, the second timing information can include one or more parameters that can be used to augment the PAwR syncInfo, such that the ESLs 712, 714 can use the second timing information to determine a PA CTE syncInfo. For instance, the PA CTE syncInfo can be used to form, jump to, or otherwise join one or more PA CTE trains associated with the AoA Tx and Rx ESLs. In some aspects, the AP_SYNC 722 received by AoA Tx ESL 712 can include synchronization information that is the same as or similar to synchronization information included in the AP_SYNC 732 received by AoA Rx ESL 714. For example, based on the Tx and Rx ESLs receiving the same synchronization information, one or more Tx ESLs can start transmitting PA CTEs at a known time relative to the one or more corresponding Rx ESLs. In one illustrative example, channel synchronization between AoA Tx ESLs and AoA Rx ESLs can be performed based on the ESLs receiving the same synchronization information from AP 710 (e.g., via AP_SYNC packets 722, 732, etc.).

In some aspects, the AP 710 can trigger an AoA ESL (e.g., AoA ESL 712) to begin transmitting PA CTEs using an AoA Tx enable transmission 724. As illustrated, the AoA Tx enable 724 can be transmitted to the Tx ESL 712 simultaneous to the AP_SYNC packet 722. In some examples, the AoA Tx enable 724 can be included in or otherwise indicated by the AP_SYNC packet 722. In other examples, the AoA Tx enable 724 can be different than the AP_SYNC packet 722.

The AoA Tx enable 724 can include timing information that may be used by the Tx ESL 712 to determine a start time for transmitting a plurality of PA CTEs 726. For instance, Tx ESL 712 can use timing information indicated by the AoA Tx enable 724 to determine a transmission time offset 782, shown in FIG. 7 as "ΔTx". The transmission offset ΔTx can be an offset relative to the Tx ESL 712 receiving the AoA Tx enable message 724 and/or can be an offset relative to the AP_SYNC 722 transmitted by AP 710 (e.g., wherein the AP_SYNC 722 time and the AoA Tx enable 724 time may be the same).

The Rx ESL 714 can receive, from AP 710, an AoA Rx enable message 734, which may be similar to the AoA Tx enable message 724. For example, the AoA Tx enable message 724 and the AoA Rx enable message 734 may include the same timing or synchronization information for forming or jumping to a PA CTE train. In one illustrative example, the AoA Rx enable 734 can include timing information that may be used by the Rx ESL 714 to determine a start time for receiving (e.g., listening for) a plurality of PA CTEs. For instance, Rx ESL 714 can use timing information indicated by the AoA Rx enable 734 to determine a reception time offset 784, shown in FIG. 7 as "ΔRx". The receive time offset ΔRx can be an offset relative to the Rx ESL 714 receiving the AoA Rx enable message 734 and/or can be an offset relative to the AP_SYNC 732 transmitted by AP 710 (e.g., wherein the AP_SYNC 732 time and the AoA Rx enable 734 time may be the same).

In one illustrative example, the ΔTx time offset 782 and the ΔRx time offset 784 can be determined as a fixed offset+a pre-determined slot delta. For example, the fixed offset can be a pre-determined offset used by each Tx and Rx ESL. In some aspects, the fixed offset can be an offset relative to the edge (e.g., beginning) of each PAwR subframe and/or can be an offset relative to an AP_SYNC packet (e.g., wherein the AP_SYNC packet time and the beginning of the PAwR subframe may be the same, based on the AP_SYNC packets being edge aligned with the PAwR subframe). In some aspects, the fixed offset can be an offset relative to the ESL receiving the AoA Tx enable message 724 or the AoA Rx enable message 734 (e.g., wherein the Tx/Rx enable messages 724/734 may be associated with the same time as the corresponding AP_SYNC packets 722, 732).

The pre-determined slot delta can be a particular time offset that is associated with a given ESL, and can be used to combine multiple ESL PA CTE trains onto a single PAwR subframe. For example, a first Tx ESL may utilize a pre-determined slot delta of 0, such that the first Tx ESL forms its PA CTE train after the fixed offset time has elapsed. A second Tx ESL may utilize a pre-determined slot delta of 1, such that the second Tx ESL forms its PA CTE train (or jumps to the first ESL's PA CTE train) in the next slot. For instance, the pre-determined slot delta can be indicative of a particular slot within a given PAwR subframe that is scheduled for a given ESL to transmit or receive a PA CTE. A slot delta of 0 can indicate that the ESL is scheduled to transmit or receive in the first slot after the fixed time offset has elapsed (e.g., wait for fixed offset to run); a slot delta of 1 can indicate that the ESL is scheduled to transmit or receive in the second slot after the fixed time offset has elapsed (e.g., wait for fixed offset to run, and wait for first slot after to run while the first ESL transmits or receives). A slot delta of 2 can indicate that the ESL is scheduled to transmit or receive in the third slot after the fixed time offset has elapsed (e.g., wait for fixed offset to run, wait for first slot after to run while the first ESL transmits or receives, wait for second slot after to run while the second ESL transmits or receives), etc.

In some aspects, during establishment of the PA CTE transmissions (e.g., as illustrated in FIG. 7) a ΔTxRx time offset 788 can be determined between the start time of the first AoA Tx ESL 712 transmitting the PA CTEs 726 and the subsequent start time of the AoA Rx ESL 714 listening for (e.g., receiving) the PA CTEs 726 (e.g., wherein the PA CTEs 726 are received as the received PA CTEs 739). For example, $\Delta TxRx$ can be determined as: $\Delta TxRx =$ (EventCounterAPSyncRx−EventCounterAPSyncTx)* 1.6 s−(GroupIDTx−GroupIDRx)*12.5 ms.

Here, EventCounterAPSyncRx is an Rx event counter that increments every PA interval (e.g., every 1.6 s) and EventCounterAPSyncTx is a Tx event counter that also increments every PA interval (e.g., every 1.6 s). For instance, the event counter can be the same as or similar to a paEventCounter that is included in or associated with a PA train (e.g., such as the ESL's PA CTE trains, the PAwR train, etc.). The EventCounterAPSyncRx can be indicative of an event counter value in a most recently received AP_SYNC at the Rx ESL 714 and the EventCounterAPSyncTx can be indicative of an event counter value in a most recently received AP_SYNC at the Tx ESL 712. In some aspects, the AP_SYNC 722 transmitted from AP 710 to Tx ESL 712 can be indicative of the EventCounterAPSyncTx value. The AP_SYNC 732 transmitted from AP 710 to Rx ESL 714 can be indicative of the EventCounterAPSyncRx value. In some examples, the AP_SYNC 732 transmitted from AP 710 to Rx ESL 714 can additionally be indicative of the EventCounterAPSyncTx value that was most recently provided to each Tx ESL (e.g., of one or more Tx ESLs) by the AP 710. Based on the AP_SYNC 732 being indicative of both the EventCounterAPSyncTx and the EventCounterAPSyncRx, the Rx ESL 714 can determine the time offset $\Delta TxRx$ indicating when to begin listening for or otherwise receiving the PA CTEs 739.

For instance, when the Tx ESL 712 and the Rx ESL 714 receive the AP_SYNC packets 722, 732, respectively, in the same PAwR interval, the two event counter values will be the same and $\Delta TxRx=(0)*1.6$ s−(GroupIDTx−GroupIDRx) *12.5 ms=(GroupIDTx−GroupIDRx)*12.5 ms. Here, based on the Tx ESL 712 and Rx ESL 714 having the same AP_SYNC event counter value, the $\Delta TxRx$ time offset between the beginning of Tx ESL 712 transmitting the PA CTEs 726 and the beginning of Rx ESL 714 listening for/receiving the PA CTEs 739 can be determined as the quantity of 12.5 ms subframes that separate the two events. For example, GroupIDTx can be indicative of a group to which the AoA Tx ESL 712 belongs, and may be used to determine the slot number that is scheduled for Tx ESL 712 within any given PAwR subframe. Similarly, GroupIDRx can be indicative of a group to which the AoA Rx ESL 714 belongs, and may be used to determine the slot number that is scheduled for Rx ESL 714 within the PAwR subframe.

In some aspects, the Tx ESL 712 can adjust its internal clock to synchronize with a reference time or reference clock of the AP 710 once every PA interval (e.g., once every 1.6 s). For instance, the AP_SYNC 722 and the AP_SYNC 732 may both be associated with a first PA interval, while the AP_SYNCS 742 and 752 are associated with a second PA interval. AP_SYNC 732 does not trigger Tx ESL 712 to adjust or synchronize its internal clock with AP 710, based on the AP_SYNC belonging to the same PA interval as AP_SYNC 722, based on which Tx ESL 712 previously synchronized its internal clock with a reference time of the AP 710.

Tx ESL 712 may receive the AP_SYNC 742 in a second PA interval, and as such, can be triggered to adjust its internal clock to re-synchronize with the reference time of AP 710. Tx ESL 712 can resynchronize with the reference time based on timing or synchronization information included in the AP_SYNC 742.

In some aspects, the Rx ESL 714 may also adjust its internal clock to resynchronize with a reference time of the AP 710 once every PA interval (e.g., once every 1.6 s). For instance, the Rx ESL 714 and the Tx ESL 712 may both re-synchronize with the reference time of AP 710 (e.g., and therefore re-synchronize with one another) at the beginning of each PA interval, based on receiving an AP_SYNC (e.g., such as AP_SYNC 742) at the beginning of the PA interval.

In one illustrative example, the Rx ESL 714 may additionally perform resynchronization or adjustment of its internal clock or timing once per subframe. For example, Rx ESL 714 can resynchronize with the Tx ESL 712 each PAwR subframe (e.g., once every 12.5 ms). In some cases, the Rx ESL 714 can adjust its internal clock or timing information to that of Tx ESL 712 based on timing or synchronization information indicated by the PA CTE that the Rx ESL 714 receives from the Tx ESL 712 in each PAwR subframe.

Figure 8:
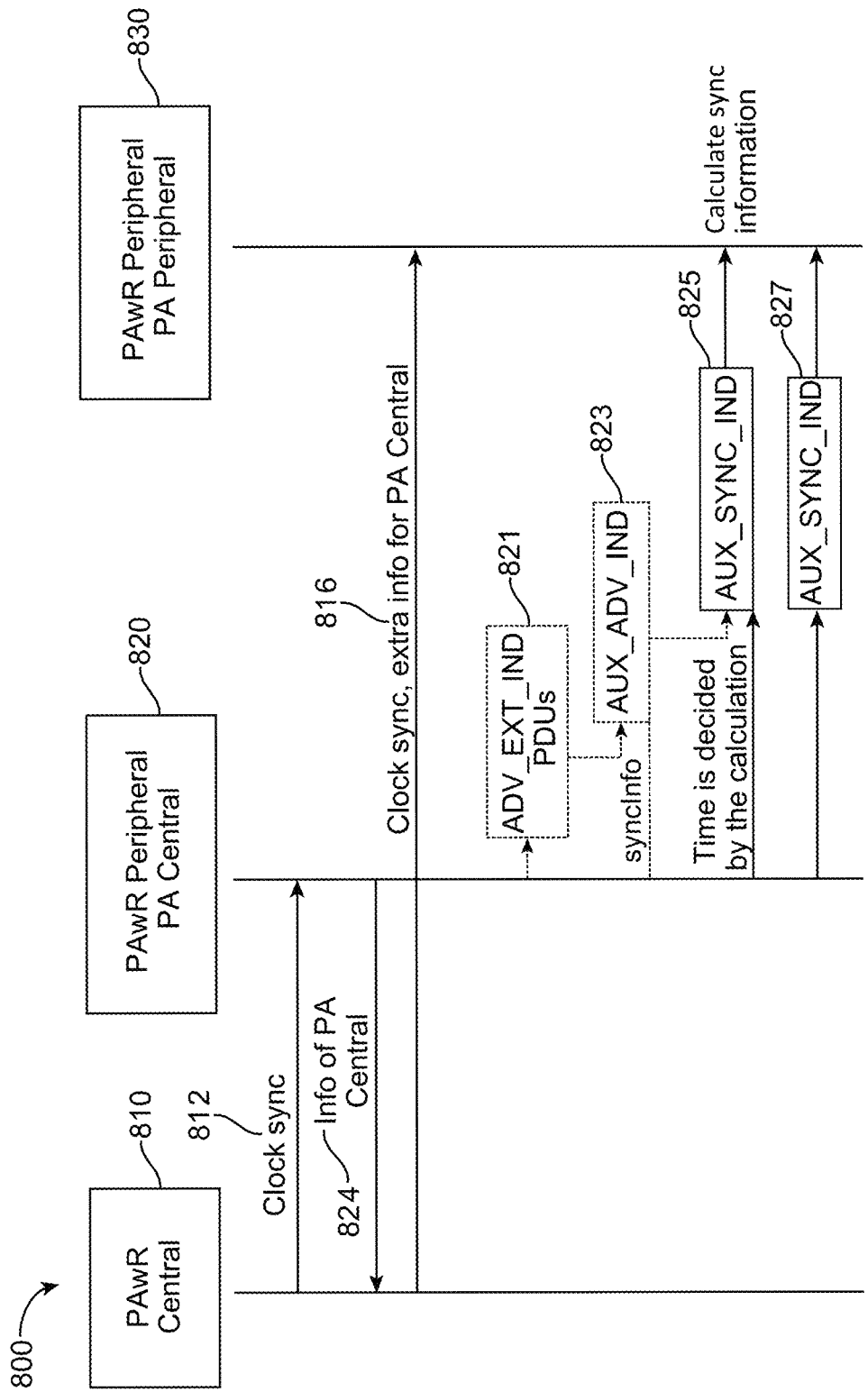
FIG. 8 is a diagram illustrating an example of connectionless synchronization that may be performed to establish time synchronized PA CTE transmissions between one or more central devices and one or more peripheral devices, in accordance with some examples.

FIG. 8 is a diagram illustrating an example of connectionless synchronization that may be performed to establish time synchronized PA CTE transmissions between an AP and a plurality of ESLs and/or between various ESLs included in the plurality of ESLs. For example, a PAwR central 810 can transmit synchronization information to a PAwR peripheral 820, via a clock sync 812. The PAwR central 810 can be a device associated with a PAwR train that accepts registrations or connections from another device associated with the PAwR train. For example, PAwR central 810 can be an AP and PAwR peripheral 820 can be an ESL (e.g., such as an AoA Tx ESL). In some aspects, the PAwR peripheral 820 may be both a PAwR peripheral device and a PA central device, such as in the example where an AoA Tx ESL registers or associates to an AP (e.g., thereby acting as a peripheral device of the PAwR train) while also accepting registration or associated from an AoA Rx ESL on a PA CTE train (e.g., thereby acting as a central device of the PA CTE train).

The peripheral 830 can be a PAwR peripheral and a PA peripheral. For example, the peripheral 830 may be an AoA Rx ESL, which is a PAwR peripheral based on registering to or associating with an AP on a PAwR train and which is a PA peripheral based on registering to or associated with an AoA Tx ESL on a PA CTE train.

In one illustrative example, the PAwR central 810 can perform a clock sync 812 with the PAwR peripheral/PA central 820, to establishing timing synchronization. The PAwR peripheral/PA central 820 can transmit a response 824 to PAwR central 810, indicative of timing information of the PA central 820. Using the timing information of the PA central 820 (e.g., received in response 824), the PAwR central 810 can perform timing synchronization 816 with the PAwR/PA peripheral 830. Inn one illustrative example, the timing synchronization 816 can be indicative of the timing information of the PA central 820. For example, the timing synchronization information 816 can be used by the PAwR/ PA peripheral 830 to derive the correct time and channel index to jump directly onto the PA train (e.g., PA CTE train) associated with the PA central 820 (e.g., AoA Rx ESL). In some aspects, the PAwR/PA peripheral 830 can use the timing synchronization information 8390 to perform connectionless synchronization with PA central 820. For instance, based on determining the time and channel index for jumping directly onto to the PA train, the PAwR/PA peripheral 830 does can avoid performing timing synchronization that may otherwise require scanning on a primary channel for ADV_EXT_IND PDUs 821 and subsequently obtaining syncInfo from an AUX_ADV_IND 823 on a secondary (e.g., legacy) channel. Based on receiving the timing synchronization information 816 of the PA central 820 (e.g., received from PAwR central 810), the PA peripheral 830 can perform connectionless synchronization with PA central 820 and jump directly to the PA train (e.g., PA CTE train) using calculated synchronization information and the AUX_SYNC_IND packets 825, 827.

In some aspects, the systems and techniques can perform synchronization based on a syncInfo field associated with a periodic advertisement. For instance, a PA syncInfo field can include a Sync Packet Offset. The systems and techniques can calculate the Sync Packet Offset locally on both the PA central 820 and the PA peripheral 830, based on a common synced AP that is associated with both the PA central 820 and the PA peripheral 830 (e.g., the PAwR central 810). The Sync Packet Offset can, in some aspects, be determined based on the common synced offset of the PAwR central 810's PAwR train and based on a configurable offset associated with the PA central 820 or PA peripheral 830 (e.g., such as the slot index assigned by an AP/PAwR central to a particular ESL (e.g., PAwR peripheral, PA central, PA peripheral) within each PAwR subframe.

In some examples, the PA syncInfo field can include an Interval. The systems and techniques can determine the Interval information based on configuration information provided by the PAwR central 810 (e.g., AP). The Interval information can be chosen to align the PA train (e.g., the AoA PA CTEs) with an existing PAwR train of the PAwR central 810.

In some examples, the PA syncInfo field can include a channel map. The systems and techniques can obtain the channel map from the PAwR train of the commonly synced AP (e.g., the PAwR central 810).

In some examples, the PA syncInfo field can include an Access Address (AA). The access address can be associated with or indicative of a particular PA train. In some aspects, the systems and techniques can determine the access address by adding an ESL identifier (EID) to the access address obtained from the commonly synced PAwR train.

In some examples, the PA syncInfo field can include a CRCInit that is the same as the CRCInit associated with commonly synced PAwR train (e.g., the same CRCInit from the syncInfo of the AP/PAwR central 810).

In some examples, the PA syncInfo field can include an Event Counter, as described previously above. The event counter field can contain the value of a paEventCounter associated with the AUX_SYNC_IND packet that is described by the syncInfo field. The paEventCounter can be a 16-bit value that is incremented by one for each PA interval (e.g., regardless of whether or not an AUX_SYNC_IND PDU is actually transmitted). The paEventCounter can be used to determine a hopping frequency sequence (HFS). In one illustrative example, the systems and techniques described herein can reinitialize the Event Counter field to zero based on a command on the ESL Tx side. A matching value can be determined for the calculated synchronization time based on the paEventCounter of the common PAwR train that triggers the transmission and reception of the new PAs (e.g., the AoA PA CTEs) and further based on the group ID of the Tx and Rx ESL(s).

In one illustrative example, the systems and techniques can perform AoA-based location determination using a plurality of PA CTEs that are transmitted by a plurality of AoA Tx ESLs using one PA train. For example, the PA CTEs transmitted by each Tx ESL of the plurality of ESLs can be combined onto a single PA train, as will be described in greater depth below.

Figure 9:
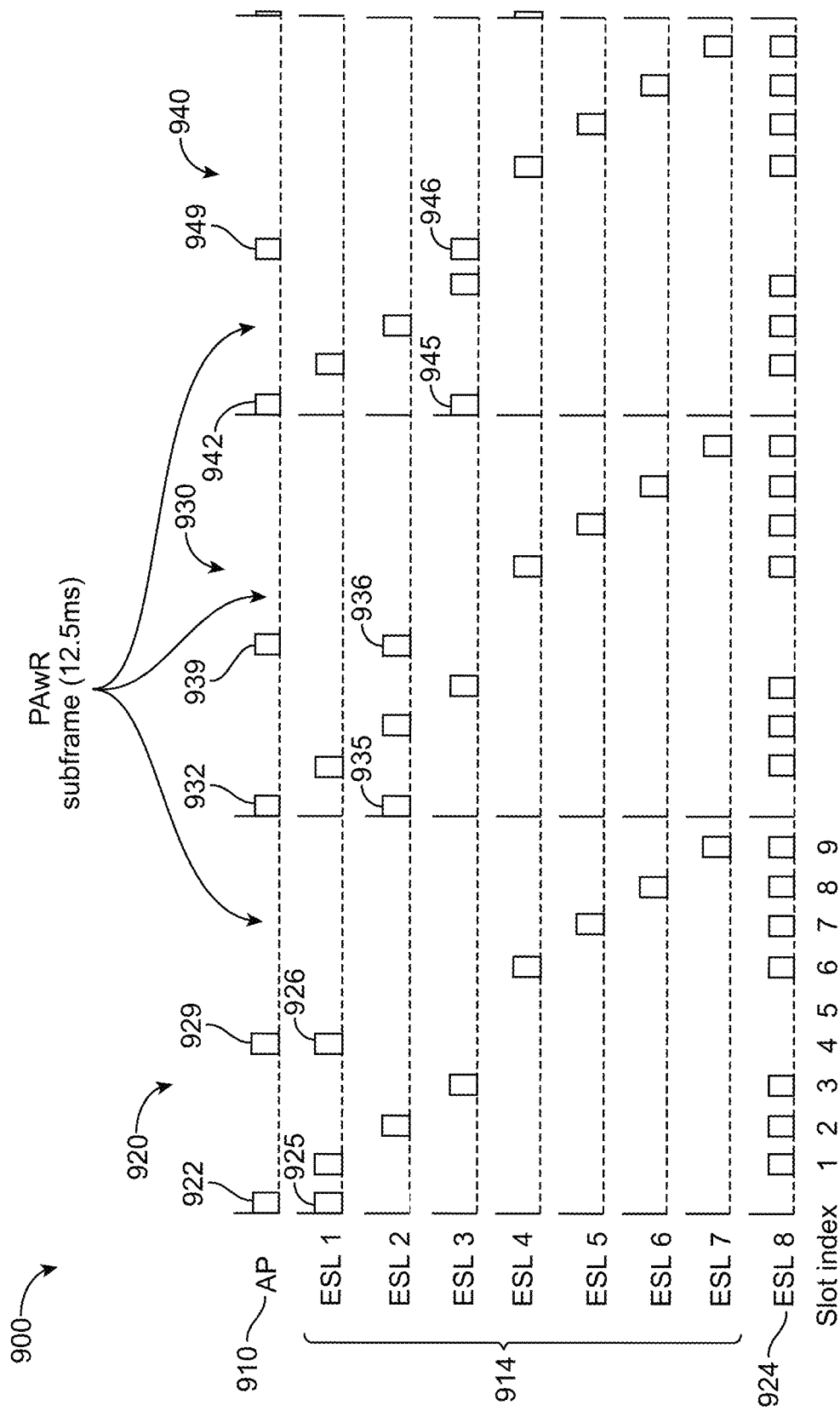
FIG. 9 is a signaling diagram illustrating an example of time synchronized PA CTE transmissions transmitted by a plurality of wireless communication devices on a combined periodic advertisement train, in accordance with some examples.

FIG. 9 is a signaling diagram illustrating an example of time synchronized PA CTE transmissions that are transmitted by a plurality of ESLs using a combined periodic advertisement train, in accordance with some examples. An AP 910 can be used to transmit one or more AP_SYNC packets (or other PAwR transmissions) on a PAwR train (e.g., on a plurality of PAwR subframes) in a manner the same as or similar to that described above with respect to AP 510 illustrated in FIG. 5, AP 610 illustrated in FIG. 6, and/or AP 710 illustrated in FIG. 7. For example, AP 910 can transmit an AP_SYNC 922 at the beginning of a first PAwR subframe 920, can transmit an AP_SYNC 932 at the beginning of a second PAwR subframe 930, can transmit an AP_SYNC 942 at the beginning of a third PAwR subframe 940, etc.

The AP_SYNC packets 922, 932, 942 can be the same as or similar to those described previously above. For example, the AP_SYNC packets can include or otherwise be indicative of timing and/or synchronization information for synchronizing a plurality of Tx ESLs 914 to transmit one or more PA CTEs for AoA-based location determination. The plurality of PA CTEs can be received and measured by one or more Rx ESLs, such as the Rx ESL 924. The Rx ESL 924 may additionally receive one or more AP_SYNC packets from AP 910 and/or may receive or otherwise obtain the same timing and/or synchronization information that is received by the Tx ESLs 914 and used to synchronize and schedule the PA CTEs.

As described previously with respect to FIGS. 5-7, in some examples, the systems and techniques can utilize a respective PA train for the PA CTEs transmitted by each respective Tx ESL. In the example of FIG. 8, seven PA trains may be utilized to transmit a corresponding seven sets of PA CTEs by the seven Tx ESLs 914. In one illustrative example, the PA CTEs transmitted by multiple ones (or all) of the Tx ESLs 914 can be combined onto a single PA train. For example, each Tx ESL 914 can be associated with or included in the same PA CTE train, wherein each of the Tx ESLs 914 transmits at a reduced rate relative to the PA CTE train rate.

For example, each PAwR subframe 920, 930, 940 may include a plurality of time slots. As illustrated, each PAwR subframe can include 10 equally sized time slots, shown as Slots 0-9 for PAwR subframe 920. In some aspects, the slots of PAwR subframe 920 can be the same as or similar to the time slots described above with respect to the PAwR subframe 500 of FIG. 5. Each Tx ESL 914 can be associated with or scheduled for a particular one of the ten slots in each PAwR subframe, such that each Tx ESL 914 can transmit a PA CTE in each PAwR subframe without conflicting with an existing PAwR transmission and without conflicting with another PA CTE transmission.

For example, in PAwR subframe 920, AP 910 can transmit an AP_SYNC 922 in Slot 0, with ESL1 shown with receiving the AP_SYNC 922 in a corresponding PAwR receive slot 925. ESL1 can transmit a PA CTE in Slot 1, and in some aspects, may initialize or form a PA CTE train that each of the Tx ESLs 914 will use for transmitting their respective PA CTEs. In some examples, Tx ESL1 can form the combined PA CTE train based on timing and/or synchronization information included in the AP_SYNC 922 from AP 910.

In Slot 2, the Tx ESL2 can transmit a PA CTE and in Slot 3, the Tx ESL3 can transmit a PA CTE. Slots 4 and 5 may be reserved for PAwR transmission from the AP 910 to the ESLs 914 and/or 924, and for PAwR reply transmissions (e.g., such as PAwR reply 926) from the ESLs 914 and/or 924 to the AP 910. For instance, the reservation of slots 4 and 5 in each PAwR subframe may be the same as or similar to the reservation of slots 4 and 5 as described above with respect to the PAwR subframe 500 of FIG. 5. In Slot 6, the Tx ESL4 can transmit its PA CTE; in Slot 7, the Tx ESL5 can transmit its PA CTE; in Slot 8, the Tx ESL6 can transmit its PA CTE; and in Slot 9, the Tx ESL7 can transmit its PA CTE.

In each instance of a PA CTE transmission by one of the Tx ESLs 914, the respective Tx ESLs can use the same PA CTE train. For example, as noted above, the first Tx ESL1 can form the combined PA CTE train in Slot 1, based on syncInfo and/or additional timing information indicated by the AP_SYNC 922. In Slot 2, the second Tx ESL2 can use the same syncInfo and additional timing information as the first Tx ESL1 (e.g., based on the second Tx ESL2 receiving the same information in an AP_SYNC transmitted by AP 910) to determine the time and channel index for jumping directly onto the combined PA CTE train. Similarly, the remaining Tx ESLs can perform the same process to jump directly onto the combined PA CTE train in their respective PAwR subframe slots, again using time and channel index information determined at the Tx ESL based on syncInfo and additional PA CTE train parameters indicated in an AP_SYNC packet from AP 910.

In each of the time slots scheduled for PA CTE transmission (e.g., Slots 1-3 and 6-9), the Rx ESL 924 can perform a same or similar process of using syncInfo and additional PA CTE train parameters indicated in an AP_SYNC packet from AP 910 to determine the time and channel index information to jump directly onto the combined PA CTE train to listen for or receive the respective PA CTE transmissions from each of the Tx ESLs 914.

In some aspects, each of the Tx ESLs 914 and the Rx ESL 924 can listen to an AP (e.g., AP 910) for their own group and response. The Rx ESL 924 can maintain a state-machine for each PA CTE train. For instance, when each Tx ESL transmits a PA CTE on its own PA CTE train, the Rx ESL 924 may need to maintain seven different state-machines to determine when to listen for/receive the corresponding PA CTE. Based on combining the PA CTE transmissions of the Tx ESLs 914 into a single, combined PA CTE train, the Rx ESL 914 may maintain one state-machine for receiving PA CTE transmissions from the plurality of Tx ESLs 914 on the combined PA CTE train.

In one illustrative example, the combined PA CTE train can be implemented based on access address information of the combined PA CTE train and slot index information indicative of a particular slot (e.g., of the seven available slots for PA CTE transmission in each PAwR subframe, with the remaining 3 slots reserved for PAwR) that is assigned to or scheduled for each respective Tx ESL of up to seven Tx ESLs on the combined PA CTE train. For instance, the slot index information can be used by each Tx ESL 914 to determine the correct EventCounter information, with an assumption of a combined PA CTE train with a PA interval of 1.25 ms.

For example, the PA interval of 1.25 ms can be based on each Tx ESL 914 using the combined PA CTE train by transmitting at $^1/_{10}$ of the rate of the combined PA train. For instance, the rate of the combined PA train can be the same as the PAwR subframe interval of 12.5 ms. Because each Tx ESL 914 can be configured to transmit on only one of the 10 total subframe slots, each Tx ESL 914 can transmit at 12.5 ms/10=1.25 ms (e.g., $^1/_{10}$ the rate of the combined PA train).

In some aspects, the slot index information used to implement the combined PA CTE train can indicate to each Tx ESL 914 the particular subframe slot in which it is scheduled to transmit a PA CTE by jumping directly onto the combined PA CTE train. The slot index information can be used by each Tx ESL 914 to determine the correct event counter information, as noted above, wherein the event counter information can be used to maintain synchronization between the Tx ESLs 914, the Rx ESL 924, and the AP 910.

In one illustrative example, the Tx ESLs 914 can operate at an increased baseline rate, to account for the $^1/_{10}$ decreased operation rate when transmitting on the combined PA CTE train. For instance, when each Tx ESL 914 is associated with an operational rate that is $^1/_{10}$ of the combined PA CTE train rate, the Tx ESLs 914 can utilize an increased baseline rate that is increased by up to a factor of 10. For instance, the Tx ESLs 914 may have an increased baseline rate of 800 Hz (e.g., a 10× increase relative to an 80 Hz baseline rate). When the baseline rate of the Tx ESLs 914 is decreased by a factor of $^1/_{10}$, the operating rate of the Tx ESLs 914 on the combined PA CTE train may be maintained at 80 Hz (e.g., rather than decreasing to 8 Hz, as may occur in the absence of the corresponding 10× increase to the baseline rate described above).

In some aspects, from the perspective of each Tx ESL 914 operating on the combined PA CTE train, the Tx ESL 914 transmits a full subframe of PA CTE transmissions during its assigned slot (e.g., a Tx ESL at 80 Hz for a full subframe and a Tx ESL at 800 Hz for $^1/_{10}$ of the full subframe (e.g., one slot) can be the same, from the perspective of the Tx ESL).

From the perspective of the Rx ESL 924, by combining the respective PA CTE transmissions associated with each of the Tx ESLs 914 in a given PAwR subframe (e.g., such as PAwR subframe 920), the combined PA CTE transmission may appear the same as a single PA CTE train transmission, but with the PA interval reduced by a factor of 10 (e.g., the combined PA CTE train transmission at Rx ESL 924 can be the same as or similar to a single PA CTE train transmission, but with a PA interval of 1.25 ms rather than 12.5 ms).

Figure 10:
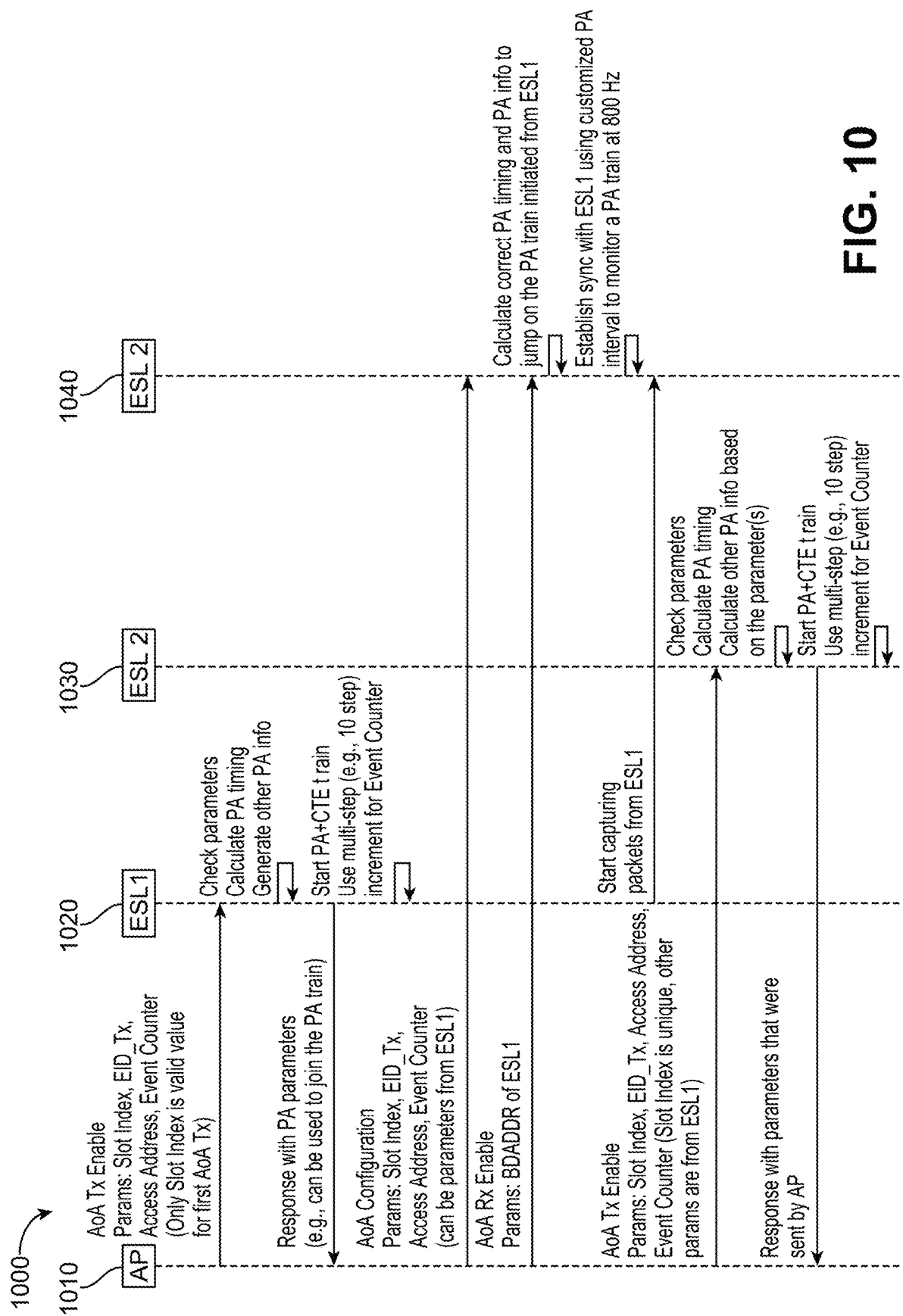
FIG. 10 is a signaling diagram illustrating an example of establishment of time synchronized PA CTE transmissions by a plurality of wireless communication devices on a combined periodic advertisement train, in accordance with some examples.

FIG. 10 is a signaling diagram illustrating an example of establishment of time synchronized PA CTE transmissions by a plurality of Tx ESLs using a combined PA train, in accordance with some examples. In some aspects, a combined PA CTE train (e.g., such as that described above with respect to FIG. 9), can be implemented based on using a first AoA Tx ESL to generate an access address for the combined PA CTE train. Subsequently, an AP can share the access address and/or other synchronization information of the combined PA CTE train determined by the first AoA Tx ESL to one or more additional AoA Tx ESLS, wherein the additional AoA Tx ESLs can jump directly onto the combined PA CTE train using the synchronization information generated by the first Tx ESL and transmitted (to the additional Tx ESLs) by the AP.

For instance, an AP 1010 can be associated with and/or synchronized with a first Tx ESL 1020, a second Tx ESL 1030, and an Rx ESL 1040. The AP 1010 can transmit an AoA Tx Enable message to the first Tx ESL 1020, which may be the first Tx ESL that is scheduled to transmit in a given PAwR subframe. The AoA Tx Enable message can be indicative of timing and/or synchronization information associated with transmitting on a PA CTE train. For instance, the AoA Tx Enable message can include a slot index assigned to the first Tx ESL 1020 by the AP 1010, can include an EID_Tx field (e.g., device ID of Tx ESL 1020), can include an access address field, and can include an event counter field. In some aspects, the AoA Tx Enable message transmitted to the first Tx ESL of a plurality of Tx ESLs (e.g., such as first Tx ESL 1020) can include a valid slot index value, and invalid values for the EID_Tx, access address, and event counter fields.

Based on receiving an AoA Tx Enable message with invalid values for the EID_Tx, access address, and event counter fields, a Tx ESL can determine that it is the first Tx ESL associated with a PA CTE train. Based on being the first Tx ESL of the PA CTE train, the Tx ESL 1020 can check the parameters included in the AoA Tx enable message, calculate PA timing information for forming the PA CTE train, and can generate additional information associated the PA CTE train. In some aspects, the information generated by the first Tx ESL 1020 can correspond to values for the invalid fields in the AoA Tx enable message received from AP 1010.

The first Tx ESL 1020 can transmit a response to AP 1010 indicative of the PA parameters determined or otherwise generated by the first Tx ESL 1020. For example, the first Tx ESL 1020 can transmit a response to AP 1010 that is indicative of the PA parameters for joining the PA CTE train that is to be formed by first Tx ESL 1020.

The first Tx ESL 1020 can start the PA CTE train using the PA parameters previously determined by the first Tx ESL 1020. In some aspects, the first Tx ESL can utilize a multi-step increment (e.g., 10 steps per increment) for an event counter associated with the PA CTE train.

The AP 1010 can transmit an AoA configuration to the Rx ESL 1040, wherein the AoA configuration includes the PA parameters determined by the first Tx ESL 1020. The AP 1010 can additionally transmit, to the Rx ESL 1040, an AoA Rx Enable message that includes a device address of the first Tx ESL 1020.

The Rx ESL 1040 can calculate the correct PA timing and PA info to jump directly onto the PA CTE train initiated from the first Tx ESL 1020. For example, the Rx ESL 1040 can calculate the correct PA timing and PA info for jumping onto the combined PA CTE train using the PA CTE train configuration parameters determined by the first Tx ESL 1020 and transmitted to the Rx ESL 1040 via the AoA configuration message from the AP 1010.

The Rx ESL 1040 can use the calculated PA timing and PA info to establish synchronization with the first Tx ESL 1020, and may use a customized PA interval to a monitor the combined PA CTWE train at 800 Hz (e.g., as described above). After establishing synchronization with the first Tx ESL 1020, the Rx ESL 1040 can start capturing packets (e.g., PA CTEs) transmitted by the first Tx ESL 1020 on the combined PA CTE train.

The AP 1010 can transmit an AoA Tx enable message to the second Tx ESL 1030, which may be the same as or similar to the AoA Tx enable message previously transmitted to the first Tx ESL 1020. In some examples, the AoA Tx enable message transmitted by AP 1010 to second Tx ESL 100 can be the same as the AoA Tx enable message for the first Tx ESL 1020, with only the slot index information changed. In one illustrative example, the AoA Tx enable message transmitted by AP 1010 to second Tx ESL 100 can include a unique slot index assigned to or scheduled for the second Tx ESL 1030 (e.g., by AP 1010), and can further include the same EID_Tx, access address, and event counter information determined by the first Tx ESL 1020 and received by the AP 1010 in the response message transmitted by the first Tx ESL 1020 in response to the AP 1010's AoA Tx enable message to the first Tx ESL 1020.

The second Tx ESL 100 can use the corresponding AoA Tx Enable message (e.g., and parameters included therein) from the AP 1010 to calculate PA timing and other PA information for jumping directly into or forming the combined PA CTE train initiated by the first Tx ESL 1020. The second Tx ESL 100 can transmit a response message to AP 1010 indicative of the parameters that were sent by AP 1010 and received by second Tx ESL 100. The second Tx ESL 100 can use the calculated PA timing and other PA information to start the combined PA CTE train initiated by the first Tx ESL 1020. The second Tx ESL 100 can transmit one or more PA CTEs on the combined PA CTE train using a multi-step increment for the event counter (e.g., 10 steps per increment).

Figure 11:
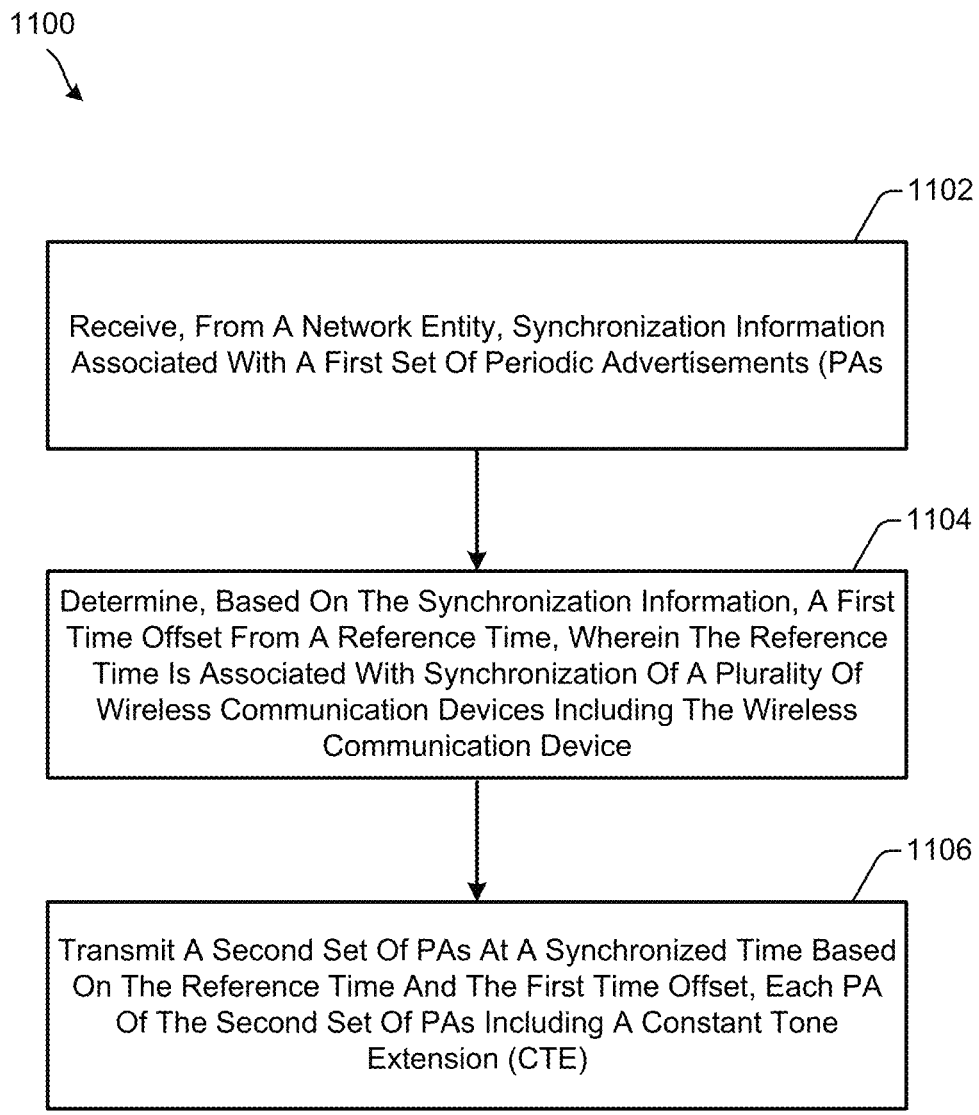
FIG. 11 is a flow chart illustrating an example of a process for wireless communications at a wireless communication device, in accordance with some examples.

FIG. 11 is a flow chart illustrating an example of a process 1100 for wireless communications. The process 1100 can be performed by a wireless communication device (e.g., such as an electronic shelf label (ESL) device, an active BLE tracker, etc.) or by a component or system (e.g., a chipset) thereof. The operations of the process 1100 may be implemented as software components that are executed and run on one or more processors (e.g., processor 1310 of FIG. 13 or other processor(s)). Further, the transmission and reception of signals by the wireless communications device in the process 1100 may be enabled, for example, by one or more antennas and/or one or more transceivers (e.g., wireless transceiver(s)).

In some aspects, the process 1100 can be performed by an AoA Tx ESL device, as described above with respect to FIGS. 5-10.

At block 1102, the process 1100 includes receiving, from a network entity, synchronization information associated with a first set of periodic advertisements (PAs). For example, the network entity can be an access point (AP), such as the AP 110 of FIG. 1, the AP 410 of FIG. 4, the AP 510 of FIG. 5, the AP 610 of FIG. 6, the AP 710 of FIG. 7, the AP 910 of FIG. 9, and/or the AP 1010 of FIG. 10. In some cases, the network entity can be the same as or similar to the management entity 130 of FIG. 1 and/or can be the same as or similar to the PAwR central 810 of FIG. 8.

In some examples, the process 1100 can be performed by a wireless communication device for wireless communications. For example, the wireless communication device can be an electronic shelf label (ESL), including one or more of the ESLs of FIGS. 4-10. In some cases, the wireless communication device can be an AoA Tx ESL, as noted above. In some examples, the wireless communication device can be a PAwR peripheral/PA central device, such as the PAwR peripheral/PA central 820 of FIG. 8. In some examples, the wireless communication device can be a PAwR peripheral/PA peripheral device, such as the PAwR peripheral/PA peripheral 830 of FIG. 8.

In some examples, the first set of PAs comprises a periodic advertisement with response (PAwR) train associated with the network entity. In some aspects, the synchronization information is included in an access point synchronization (AP_SYNC) packet. For example, the synchronization information can be included in one or more of the AP_SYNC packets 622, 632, 642 of FIG. 6; can be included in one or more of the AP_SYNC packets 722, 732, 742, 753 of FIG. 7; can be included in one or more of the AP_SYNC packets 922, 929, 932, 939, 942, 949 of FIG. 9; etc. In some aspects, the synchronization information can be included in a PAwR transmission in each PA subframe of a plurality of PA subframes associated with the network entity and/or the wireless communication device. For instance, the synchronization information can be included in a first PAwR transmission in each PA subframe of a plurality of PA subframes, such as the PA (e.g., PAwR) subframes illustrated in FIGS. 6, 7, and/or 9.

At block 1104, the process 1100 includes determining, based on the synchronization information, a first time offset from a reference time, wherein the reference time is associated with synchronization of a plurality of wireless communication devices including the wireless communication device. For instance, the reference time can be a time associated with transmission of the AP_SYNC packet from the network entity (e.g., AP). In some cases, the synchronized time can be determined as a sum of the reference time and a first time offset that is a multiple of a pre-determined time offset interval. The first time offset can be a particular time offset associated with the wireless communication device (e.g., an AoA Tx ESL).

In some cases, information associated with the pre-determined time offset interval is received from the network entity and a length of the pre-determined time offset interval is the same as a length of a sub-division of a PAwR subframe. For instance, the PAwR subframe can be used to transmit, by the network entity, one or more PAs of the first set of PAs. In some examples, the synchronized time can be determined as a sum of the reference time and a first time offset that is a multiple of a pre-determined time offset interval, wherein the pre-determined time offset interval is an integer multiple of a sub-division (e.g., sub-interval) of a PA (e.g., PAwR) subframe. For instance, the pre-determined time offset interval can be 1.25 ms, representing one of ten equally sized sub-divisions (e.g., sub-intervals) of a 12.5 ms PAwR subframe.

In some examples, the subframe includes a plurality of non-overlapping time slots, the plurality of non-overlapping time slots including a subset of reserved time slots for PAwR responses and a subset of non-reserved time slots. For instance, the subframe can be the same as or similar to the PAwR subframe 500 of FIG. 5 and can include a plurality of non-overlapping 1.25 ms time slots as illustrated in FIG. 5. In some cases, the subset of reserved time slots for PAwR responses can be the same as or similar to the reserved time slots Slot 4 and Slot 5 depicted in FIG. 5 and the subset of non-reserved time slots can be the same as or similar to the non-reserved time slots 522 and/or 526 of FIG. 5. In some aspects, each PA of a second set of PAs can be transmitted using a particular time slot of the subset of non-reserved time slots. In some examples, the subset of reserved time slots includes a plurality of AP_SYNC response slots, the plurality of AP_SYNC response slots and the reserved time slots associated with different durations. In some cases, the plurality of reserved AP_SYNC response slots includes at least three AP_SYNC response slots and/or includes at least three ESL response slots, such as those depicted in FIG. 5.

At block 1106, the process 1100 includes transmitting a second set of PAs at a synchronized time based on the reference time and the first time offset, each PA of the second set of PAs including a constant tone extension (CTE). For example, the second set of PAs can comprise a PA CTE train associated with the wireless communication device (e.g., AoA Tx ESL). In some cases, the synchronized time can be determined as a sum of the reference time and a multiple of a pre-determined time offset interval. For instance, the reference time can be the AP_SYNC time used to synchronize the AP clock (e.g., network entity clock) with the respective clocks of a plurality of AoA Tx ESLs and/or one or more AoA Rx ESLs.

In some cases, each PA of the second set of PAs (e.g., each PA CTE) can be transmitted using a particular time slot of the subset of non-reserved time slots. For instance, a first AoA Tx ESL can transmit a PA CTE using a first time slot (e.g., the reference time plus a first offset particular to the first AoA Tx ESL); a second AoA Tx ESL can transmit a PA CTE using a second time slot (e.g., the same reference time plus a second offset particular to the second AoA Tx ESL); etc.

In some aspects, the wireless communication device can determine one or more parameters associated with forming a PA train (e.g., a PA CTE train). For instance, the one or more parameters can be based on a slot index included in the synchronization information. The wireless communication device can transmit, to the network entity, the one or more parameters and can form the PA train using the one or more parameters. The wireless communication device (e.g., AoA Tx ESL) can transmit the second set of PA CTEs using the PA train (e.g., PA CTE train). In some aspects, the network entity can generate synchronization information based on the one or more parameters and may transmit the generated synchronization information to additional AoA Tx ESLs that are also associated with the network entity (e.g., associated with the network entity (e.g., AP)'s PAwR train).

In some cases, a first time slot of the PA CTE train is associated with the second set of PA CTEs. A second time slot of the PA CTE train can be associated with an additional set of PA CTEs that are transmitted on the PA CTE train by a second wireless communication device (e.g., a second AoA Tx ESL). In some cases, the one or more parameters associated with forming the PA CTE train can be determined, by the wireless communication device (e.g., AoA Tx ESL) based on the synchronization information including an invalid value for one or more pre-determined fields. In some cases, the one or more pre-determined fields can include one or more of a group ID field, an access address field, or an event counter field.

Figure 12:
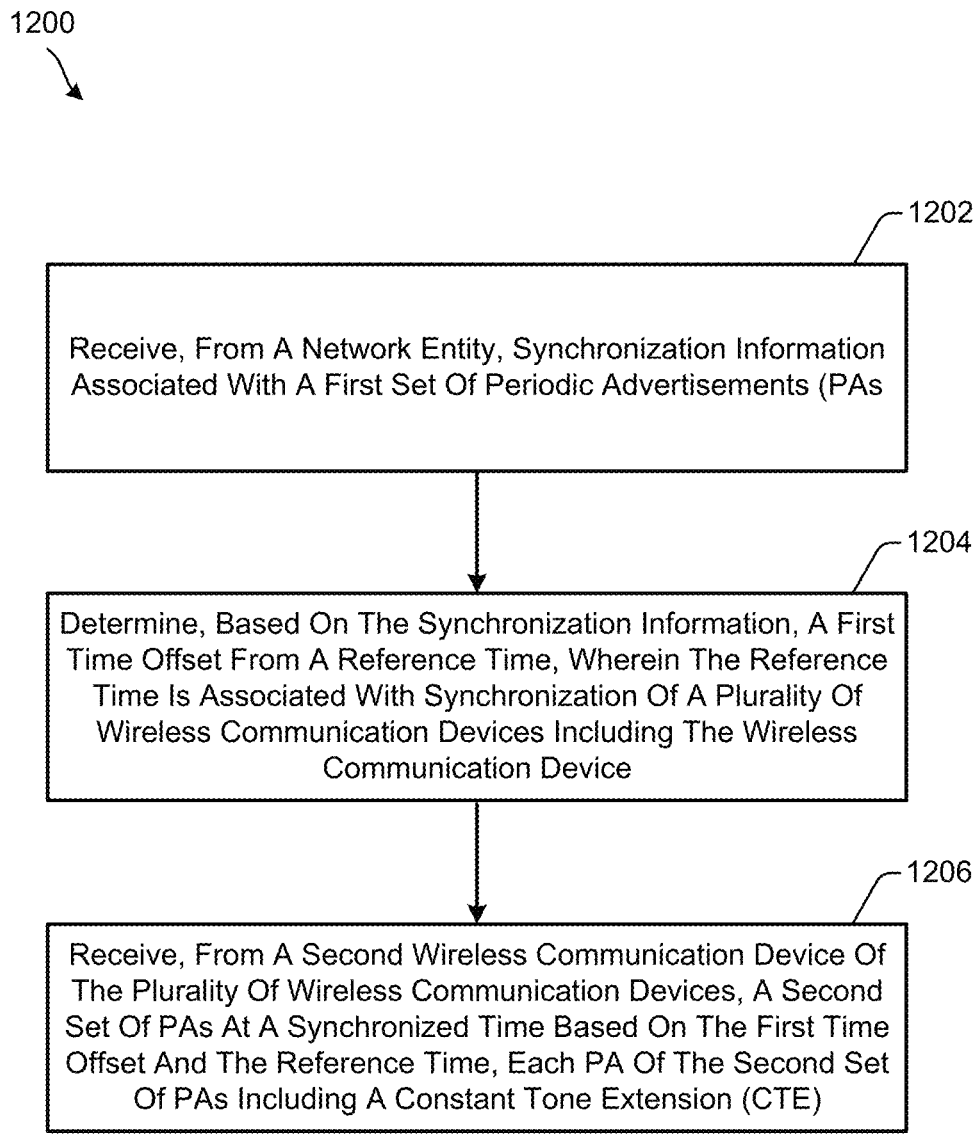
FIG. 12 is a flow chart illustrating an example of a process for wireless communications at a network device, in accordance with some examples.

FIG. 12 is a flow chart illustrating an example of a process 1200 for wireless communications. The process 1200 can be performed by a network entity (e.g., such as an ME) and/or a network device (e.g., such as an AP) or by a component or system (e.g., a chipset) thereof. The operations of the process 1200 may be implemented as software components that are executed and run on one or more processors (e.g., processor 1310 of FIG. 13 or other processor(s)). Further, the transmission and reception of signals by the wireless communications device in the process 1200 may be enabled, for example, by one or more antennas and/or one or more transceivers (e.g., wireless transceiver(s)).

In some aspects, the process 1200 can be performed by an AoA Rx ESL device, such as one or more of the AoA RX ESL devices described above with respect to FIGS. 5-10.

At block 1202, the process 1200 includes receiving, from a network entity, synchronization information associated with a first set of periodic advertisements (PAs). For example, the network entity can be an access point (AP), such as the AP 110 of FIG. 1, the AP 410 of FIG. 4, the AP 510 of FIG. 5, the AP 610 of FIG. 6, the AP 710 of FIG. 7, the AP 910 of FIG. 9, and/or the AP 1010 of FIG. 10. In some cases, the network entity can be the same as or similar to the management entity 130 of FIG. 1 and/or can be the same as or similar to the PAwR central 810 of FIG. 8.

In some examples, the process 1100 can be performed by a wireless communication device for wireless communications. For example, the wireless communication device can be an electronic shelf label (ESL), including one or more of the ESLs of FIGS. 4-10. In some cases, the wireless communication device can be an AoA Rx ESL, as noted above. In some examples, the wireless communication device can be a PAwR peripheral/PA central device, such as the PAwR peripheral/PA central 820 of FIG. 8. In some examples, the wireless communication device can be a PAwR peripheral/PA peripheral device, such as the PAwR peripheral/PA peripheral 830 of FIG. 8.

In some examples, the first set of PAs comprises a periodic advertisement with response (PAwR) train associated with the network entity. In some aspects, the synchronization information is included in an access point synchronization (AP_SYNC) packet. For example, the synchronization information can be included in one or more of the AP_SYNC packets 622, 632, 642 of FIG. 6; can be included in one or more of the AP_SYNC packets 722, 732, 742, 753 of FIG. 7; can be included in one or more of the AP_SYNC packets 922, 929, 932, 939, 942, 949 of FIG. 9; etc. In some aspects, the synchronization information can be included in a PAwR transmission in each PA subframe of a plurality of PA subframes associated with the network entity and/or the wireless communication device. For instance, the synchronization information can be included in a first PAwR transmission in each PA subframe of a plurality of PA subframes, such as the PA (e.g., PAwR) subframes illustrated in FIGS. 6, 7, and/or 9.

At block 1204, the process 1200 includes determining, based on the synchronization information, a first time offset from a reference time, wherein the reference time is associated with synchronization of a plurality of wireless communication devices including the wireless communication device. For instance, the reference time can be a time associated with transmission of the AP_SYNC packet from the network entity (e.g., AP). In some examples, the reference time is associated with synchronization of a plurality of AoA Tx ESLs, one or more AoA Rx ESLs, and/or the network entity (e.g., AP). For instance, the AP_SYNC packet can be used to synchronize an AP clock with the respective clocks of the plurality of AoA Tx ESLs and the one or more AoA Rx ESLs. In some cases, additional synchronization can be performed periodically between the one or more AoA Rx ESLs (e.g., including the wireless communication device of process 1200) and the plurality of AoA Tx ESLs. In some cases, the synchronized time can be determined as a sum of the reference time and a first time offset that is a multiple of a pre-determined time offset interval. The first time offset can be a particular time offset associated with the wireless communication device (e.g., an AoA Tx ESL).

In some cases, information associated with the pre-determined time offset interval is received from the network entity and a length of the pre-determined time offset interval is the same as a length of a sub-division of a PAwR subframe. For instance, the PAwR subframe can be used to transmit, by the network entity, one or more PAs of the first set of PAs. In some examples, the synchronized time can be determined as a sum of the reference time and a first time offset that is a multiple of a pre-determined time offset interval, wherein the pre-determined time offset interval is an integer multiple of a sub-division (e.g., sub-interval) of a PA (e.g., PAwR) subframe. For instance, the pre-determined time offset interval can be 1.25 ms, representing one of ten equally sized sub-divisions (e.g., sub-intervals) of a 12.5 ms PAwR subframe.

In some examples, the subframe includes a plurality of non-overlapping time slots, the plurality of non-overlapping time slots including a subset of reserved time slots for PAwR responses and a subset of non-reserved time slots. For instance, the subframe can be the same as or similar to the PAwR subframe 500 of FIG. 5 and can include a plurality of non-overlapping 1.25 ms time slots as illustrated in FIG. 5. In some cases, the subset of reserved time slots for PAwR responses can be the same as or similar to the reserved time slots Slot 4 and Slot 5 depicted in FIG. 5 and the subset of non-reserved time slots can be the same as or similar to the non-reserved time slots 522 and/or 526 of FIG. 5. In some aspects, each PA of a second set of PAs can be received, by the wireless communication device (e.g., AoA Rx ESL) using a particular time slot of the subset of non-reserved time slots. In some examples, the subset of reserved time slots includes a plurality of AP_SYNC response slots, the plurality of AP_SYNC response slots and the reserved time slots associated with different durations. In some cases, the plurality of reserved AP_SYNC response slots includes at least three AP_SYNC response slots and/or includes at least three ESL response slots, such as those depicted in FIG. 5.

At block 1206, the process 1200 includes receiving, from a second wireless communication device of the plurality of wireless communication devices, a second set of PAs at a synchronized time based on the first time offset and the reference time, each PA of the second set of PAs including a constant tone extension (CTE). For instance, the wireless communication device of process 1200 can be an AoA Rx ESL and the second wireless communication device can be an AoA Tx ESL. For instance, the wireless communication device of process 1200 can be an AoA Rx ESL that is the same as or similar to one or more of the AoA Rx ESL 614*d* of FIG. 6, the AoA Rx ESL 714 of FIG. 7, the AoA Rx ESL 924 of FIG. 9, and/or the AoA Rx ESL 1040 of FIG. 10.

The second set of PAs can comprise a PA CTE train associated with one or more AoA Tx ESLs that are different than the AoA Rx ESL of process 1200 and are included in the same plurality of wireless communication devices (e.g., associated with the same network entity or AP) as the AoA Rx ESL of process 1200. In some cases, a synchronized time can be determined for the second wireless communication device (e.g., can be determined by the AoA Rx ESL for each respective one of the AoA Tx ESLs) as a sum of the same reference time and a corresponding multiple of a pre-determined time offset interval (e.g., a corresponding multiple for each respective one of the AoA Tx ESLs). For instance, the reference time can be the AP_SYNC time used to synchronize the AP clock (e.g., network entity clock) with the respective clocks of a plurality of AoA Tx ESLs and/or one or more AoA Rx ESLs.

In some cases, each PA of the second set of PAs (e.g., each PA CTE) can be received using a particular time slot of the subset of non-reserved time slots. For instance, a first AoA Tx ESL can transmit a PA CTE using a first time slot (e.g., the reference time plus a first offset particular to the first AoA Tx ESL) and the AoA Rx ESL of process 1200 can receive the PA CTE using the first time slot; a second AoA Tx ESL can transmit a PA CTE using a second time slot (e.g., the same reference time plus a second offset particular to the second AoA Tx ESL) and the AoA Rx ESL of process 1200 can receive the PA CTE using the second time slot; etc.

In some aspects, the wireless communication device can determine, based on the synchronization, the second time offset from the reference time, the second time offset comprising a second multiple of the pre-determined time offset interval different from the first multiple. For instance, the first time offset can be a multiple n=1 of the 1.25 ms subinterval of the 12.5 ms PAwR subframe, the second time offset can be a multiple n=2 of the 1.25 ms subinterval of the 12.5 ms PAwR subframe, etc. The wireless communication device (e.g., AoA Rx ESL) can receive, from a third wireless communication device (e.g., a second AoA Tx ESL) of the plurality of wireless communication devices, a PA CTE at a second synchronized time based on the reference time and the second time offset. The second synchronized time can be immediately subsequent to the first synchronized time associated with the AoA Rx ESL receiving the PA CTE from the second wireless communication device (e.g., a first AoA Tx ESL).

The network entity, network device, and/or the wireless communication device may include various components, such as one or more input devices, one or more output devices, one or more processors, one or more microprocessors, one or more microcomputers, one or more cameras, one or more sensors, one or more receivers, transmitters, and/or transceivers, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of a device configured to perform the process 1100 of FIG. 11 and/or the device configured to perform the process 1200 of FIG. 12 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1100 and the process 1200 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1100, process 1200, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
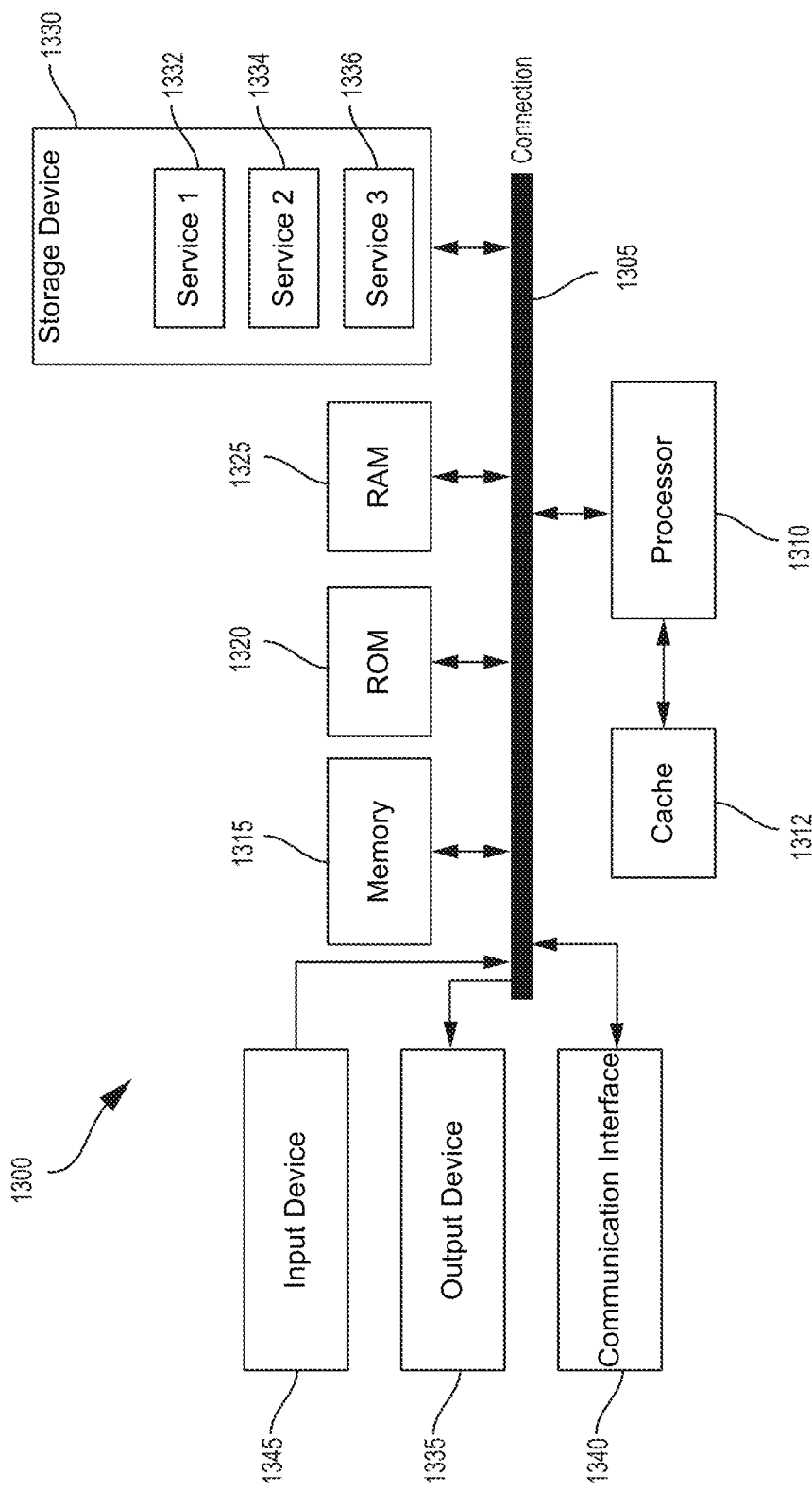
FIG. 13 is a block diagram illustrating an example of a computing system, which may be employed by the disclosed systems and techniques, in accordance with some examples.

FIG. 13 is a block diagram illustrating an example of a computing system 1300, which may be employed by the disclosed systems and techniques. In particular, FIG. 13 illustrates an example of computing system 1300, which can be, for example, any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some aspects, computing system 1300 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1300 includes at least one processing unit (CPU or processor) 1310 and connection 1305 that communicatively couples various system components including system memory 1315, such as read-only memory (ROM) 1320 and random-access memory (RAM) 1325 to processor 1310. Computing system 1300 can include a cache 1312 of high-speed memory connected directly with, in close proximity to, or integrated as part of processor 1310.

Processor 1310 can include any general-purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300.

Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1340 may also include one or more range sensors (e.g., LIDAR sensors, laser range finders, RF radars, ultrasonic sensors, and infrared (IR) sensors) configured to collect data and provide measurements to processor 1310, whereby processor 1310 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some aspects, a hardware service that performs a particular function can include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1. A wireless communication device for wireless communications, the wireless communication device comprising: at least one memory; and at least one processor coupled to the at least one memory and configured to: receive, from a network entity, synchronization information associated with a first set of periodic advertisements (PAs); determine, based on the synchronization information, a first time offset from a reference time, wherein the reference time is associated with synchronization of a plurality of wireless communication devices including the wireless communication device; and transmit a second set of PAs at a synchronized time based on the reference time and the first time offset, each PA of the second set of PAs including a constant tone extension (CTE).

Aspect 2. The wireless communication device of Aspect 1, wherein the at least one processor is configured to: determine the synchronized time as a sum of the reference time and a multiple of a pre-determined time offset interval.

Aspect 3. The wireless communication device of Aspect 2, wherein: information associated with the pre-determined time offset interval is received from the network entity; and a length of the pre-determined time offset interval is the same as a length of a sub-division of a periodic advertisement with response (PAwR) subframe.

Aspect 4. The wireless communication device of any of Aspects 1 to 3, wherein: the first set of PAs comprises a periodic advertisement with response (PAwR) train associated with the network entity; and the second set of PAs comprises a PA with CTE train associated with the wireless communication device.

Aspect 5. The wireless communication device of any of Aspects 1 to 4, wherein the synchronization information is included in an access point synchronization (AP_SYNC) packet.

Aspect 6. The wireless communication device of Aspect 5, wherein the reference time is a time associated with transmission of the AP_SYNC packet.

Aspect 7. The wireless communication device of any of Aspects 3 to 6, wherein: the subframe includes a plurality of non-overlapping time slots, the plurality of non-overlapping time slots including a subset of reserved time slots for PAwR responses and a subset of non-reserved time slots; and each PA of the second set of PAs is transmitted using a particular time slot of the subset of non-reserved time slots.

Aspect 8. The wireless communication device of Aspect 7, wherein the subset of reserved time slots includes a plurality of access point synchronization (AP_SYNC) response slots, the plurality of AP_SYNC response slots and the reserved time slots associated with different durations.

Aspect 9. The wireless communication device of Aspect 8, wherein the plurality of AP_SYNC response slots includes at least three AP_SYNC response slots.

Aspect 10. The wireless communication device of any of Aspects 1 to 9, wherein the at least one processor is configured to: determine one or more parameters associated with forming a PA train, the one or more parameters based on a slot index included in the synchronization information; transmit, to the network entity, the one or more parameters; form the PA train using the one or more parameters; and transmit the second set of PAs using the PA train.

Aspect 11. The wireless communication device of Aspect 10, wherein: a first time slot of the PA train is associated with the second set of PAs including the CTE; and a second time slot of the PA train is associated with an additional set of PAs, each PA of the additional set of PAs including the CTE and transmitted on the PA train by a second wireless communication device.

Aspect 12. The wireless communication device of any of Aspects 10 to 11, wherein the at least one processor is configured to determine the one or more parameters associated with forming the PA train based on the synchronization information including an invalid value for one or more pre-determined fields.

Aspect 13. The wireless communication device of Aspect 12, wherein the one or more pre-determined fields include one or more of a group ID field, an access address field, or an event counter field.

Aspect 14. The wireless communication device of any of Aspects 1 to 13, wherein the network entity is an access point (AP).

Aspect 15. The wireless communication device of any of Aspects 1 to 14, wherein the wireless communication device is an electronic shelf label (ESL).

Aspect 16. A wireless communication device for wireless communications, the wireless communication device comprising: at least one memory; and at least one processor coupled to the at least one memory and configured to: receive, from a network entity, synchronization information associated with a first set of periodic advertisements (PAs); determine, based on the synchronization information, a first time offset from a reference time, wherein the reference time is associated with synchronization of a plurality of wireless communication devices including the wireless communication device; and receive, from a second wireless communication device of the plurality of wireless communication devices, a second set of PAs at a synchronized time based on the first time offset and the reference time, each PA of the second set of PAs including a constant tone extension (CTE).

Aspect 17. The wireless communication device of Aspect 16, wherein the at least one processor is configured to: determine the synchronized time as a sum of the reference time and a first multiple of a pre-determined time offset interval.

Aspect 18. The wireless communication device of Aspect 17, wherein: information associated with the pre-determined time offset interval is received from the network entity; and a length of the pre-determined time offset interval is the same as a length of a sub-division of a periodic advertisement with response (PAwR) subframe.

Aspect 19. The wireless communication device of any of Aspects 17 to 18, wherein the at least one processor is further configured to: determine, based on the synchronization information, a second time offset from the reference time, the second time offset comprising a second multiple of the pre-determined time offset interval different from the first multiple; receive, from a third wireless communication device of the plurality of wireless communication devices, a PA including a CTE at a second synchronized time based on the reference time and the second time offset.

Aspect 20. The wireless communication device of any of Aspects 16 to 19, wherein: the first set of PAs comprises a periodic advertisement with response (PAwR) train associated with the network entity; and the second set of PAs comprises a PA with CTE train associated with the second wireless communication device.

Aspect 21. The wireless communication device of any of Aspects 16 to 20, wherein the synchronization information is synchronization information generated by the second wireless communication device and associated with transmitting one or more PA CTEs received by the wireless communication device.

Aspect 22. The wireless communication device of any of Aspects 16 to 21, wherein the synchronization information is included in an access point synchronization (AP_SYNC) packet.

Aspect 23. The wireless communication device of Aspect 22, wherein the reference time is a time associated with transmission or reception of the AP_SYNC packet.

Aspect 24. The wireless communication device of any of Aspects 21 to 23, wherein the synchronization information includes one or more of a slot index associated with the wireless communication device, a group ID field, an access address field, or an event counter field.

Aspect 25. The wireless communication device of any of Aspects 18 to 24, wherein: the subframe includes a plurality of non-overlapping time slots, the plurality of non-overlapping time slots including a subset of reserved time slots for PAwR responses and a subset of non-reserved time slots; and each PA of the second set of PAs is received using a particular time slot of the subset of non-reserved time slots.

Aspect 26. The wireless communication device of Aspect 25, wherein the subset of reserved time slots includes a plurality of access point synchronization (AP_SYNC) response slots, the plurality of AP_SYNC response slots and the reserved time slots associated with different durations.

Aspect 27. The wireless communication device of Aspect 26, wherein the plurality of AP_SYNC response slots includes at least three AP_SYNC response slots.

Aspect 28. The wireless communication device of any of Aspects 16 to 27, wherein the at least one processor is configured to: receive, from the second wireless communication device, the second set of PAs using a first time slot of a PA CTE train; and receive, from a third wireless communication device, a third set of PAs using a time slot of the PA CTE train different from the first time slot, wherein the second set of PAs and the third set of PAs each include one or more PA CTEs.

Aspect 29. The wireless communication device of any of Aspects 16 to 28, wherein the network entity is an access point (AP).

Aspect 30. The wireless communication device of any of Aspects 16 to 29, wherein the wireless communication device is an electronic shelf label (ESL).

Aspect 31. A method of wireless communication performed at a wireless communication device, the method comprising: receiving, from a network entity, synchronization information associated with a first set of periodic advertisements (PAs); determining, based on the synchronization information, a first time offset from a reference time, wherein the reference time is associated with synchronization of a plurality of wireless communication devices including the wireless communication device; and transmitting a second set of PAs at a synchronized time based on the reference time and the first time offset, each PA of the second set of PAs including a constant tone extension (CTE).

Aspect 32. The method of Aspect 31, further comprising: determining the synchronized time as a sum of the reference time and a multiple of a pre-determined time offset interval.

Aspect 33. The method of Aspect 32, wherein: information associated with the pre-determined time offset interval is received from the network entity; and a length of the pre-determined time offset interval is the same as a length of a sub-division of a periodic advertisement with response (PAwR) subframe.

Aspect 34. The method of any of Aspects 31 to 33, wherein: the first set of PAs comprises a periodic advertisement with response (PAwR) train associated with the network entity; and the second set of PAs comprises a PA with CTE train associated with the wireless communication device.

Aspect 35. The method of any of Aspects 31 to 34, wherein the synchronization information is included in an access point synchronization (AP_SYNC) packet.

Aspect 36. The method of Aspect 35, wherein the reference time is a time associated with transmission of the AP_SYNC packet.

Aspect 37. The method of any of Aspects 33 to 36, wherein: the subframe includes a plurality of non-overlapping time slots, the plurality of non-overlapping time slots including a subset of reserved time slots for PAwR responses and a subset of non-reserved time slots; and each PA of the second set of PAs is transmitted using a particular time slot of the subset of non-reserved time slots.

Aspect 38. The method of Aspect 37, wherein the subset of reserved time slots includes a plurality of access point synchronization (AP_SYNC) response slots, the plurality of AP_SYNC response slots and the reserved time slots associated with different durations.

Aspect 39. The method of Aspect 38, wherein the plurality of AP_SYNC response slots includes at least three AP_SYNC response slots.

Aspect 40. The method of any of Aspects 31 to 39, further comprising: determining one or more parameters associated with forming a PA train, the one or more parameters based on a slot index included in the synchronization information; transmitting, to the network entity, the one or more parameters; forming the PA train using the one or more parameters; and transmitting the second set of PAs using the PA train.

Aspect 41. The method of Aspect 40, wherein: a first time slot of the PA train is associated with the second set of PAs including the CTE; and a second time slot of the PA train is associated with an additional set of PAs, each PA of the additional set of PAs including the CTE and transmitted on the PA train by a second wireless communication device.

Aspect 42. The method of any of Aspects 40 to 41, further comprising determining the one or more parameters associated with forming the PA train based on the synchronization information including an invalid value for one or more pre-determined fields.

Aspect 43. The method of Aspect 42, wherein the one or more pre-determined fields include one or more of a group ID field, an access address field, or an event counter field.

Aspect 44. The method of any of Aspects 31 to 43, wherein the network entity is an access point (AP).

Aspect 45. The method of any of Aspects 31 to 44, wherein the wireless communication device is an electronic shelf label (ESL).

Aspect 46. A method of wireless communication performed at a wireless communication device, the method comprising: receiving, from a network entity, synchronization information associated with a first set of periodic advertisements (PAs); determining, based on the synchronization information, a first time offset from a reference time, wherein the reference time is associated with synchronization of a plurality of wireless communication devices including the wireless communication device; and receiving, from a second wireless communication device of the plurality of wireless communication devices, a second set of PAs at a synchronized time based on the first time offset and the reference time, each PA of the second set of PAs including a constant tone extension (CTE).

Aspect 47. The method of Aspect 46, further comprising determining the synchronized time as a sum of the reference time and a first multiple of a pre-determined time offset interval.

Aspect 48. The method of Aspect 47, wherein: information associated with the pre-determined time offset interval is received from the network entity; and a length of the pre-determined time offset interval is the same as a length of a sub-division of a periodic advertisement with response (PAwR) subframe.

Aspect 49. The method of any of Aspects 47 to 48, further comprising: determining, based on the synchronization information, a second time offset from the reference time, the second time offset comprising a second multiple of the pre-determined time offset interval different from the first multiple; receiving, from a third wireless communication device of the plurality of wireless communication devices, a PA including a CTE at a second synchronized time based on the reference time and the second time offset.

Aspect 50. The method of any of Aspects 46 to 49, wherein: the first set of PAs comprises a periodic advertisement with response (PAwR) train associated with the network entity; and the second set of PAs comprises a PA with CTE train associated with the second wireless communication device.

Aspect 51. The method of any of Aspects 46 to 50, wherein the synchronization information is synchronization information generated by the second wireless communication device and associated with transmitting one or more PA CTEs received by the wireless communication device.

Aspect 52. The method of any of Aspects 46 to 51, wherein the synchronization information is included in an access point synchronization (AP_SYNC) packet.

Aspect 53. The method of Aspect 52, wherein the reference time is a time associated with transmission or reception of the AP_SYNC packet.

Aspect 54. The method of any of Aspects 51 to 53, wherein the synchronization information includes one or more of a slot index associated with the wireless communication device, a group ID field, an access address field, or an event counter field.

Aspect 55. The method of any of Aspects 48 to 54, wherein: the subframe includes a plurality of non-overlapping time slots, the plurality of non-overlapping time slots including a subset of reserved time slots for PAwR responses and a subset of non-reserved time slots; and each PA of the second set of PAs is received using a particular time slot of the subset of non-reserved time slots.

Aspect 56. The method of Aspect 55, wherein the subset of reserved time slots includes a plurality of access point synchronization (AP_SYNC) response slots, the plurality of AP_SYNC response slots and the reserved time slots associated with different durations.

Aspect 57. The method of Aspect 56, wherein the plurality of AP_SYNC response slots includes at least three AP_SYNC response slots.

Aspect 58. The method of any of Aspects 46 to 57, further comprising: receiving, from the second wireless communication device, the second set of PAs using a first time slot of a PA CTE train; and receiving, from a third wireless communication device, a third set of PAs using a time slot of the PA CTE train different from the first time slot, wherein the second set of PAs and the third set of PAs each include one or more PA CTEs.

Aspect 59. The method of any of Aspects 46 to 58, wherein the network entity is an access point (AP).

Aspect 60. The method of any of Aspects 46 to 59, wherein the wireless communication device is an electronic shelf label (ESL).

Aspect 61. A non-transitory computer-readable medium including instructions that, when executed by at least one processor, cause the at least one processor to perform operations according to any of Aspects 31 to 45.

Aspect 62 An apparatus for wireless communication, the apparatus comprising one or more means for performing operations according to any of Aspects 31 to 45.

Aspect 63. A non-transitory computer-readable medium including instructions that, when executed by at least one processor, cause the at least one processor to perform operations according to any of Aspects 46 to 60.

Aspect 64. An apparatus for wireless communication, the apparatus comprising one or more means for performing operations according to any of Aspects 46 to 60.

What is claimed is:

1. A wireless communication device for wireless communications, the wireless communication device comprising:
   at least one memory; and
   at least one processor coupled to the at least one memory and configured to:
      receive, from a network entity, synchronization information associated with a first set of periodic advertisements (PAs);
      determine, based on the synchronization information, a first time offset from a reference time, wherein the reference time is associated with synchronization of a plurality of wireless communication devices including the wireless communication device; and
      transmit a second set of PAs at a synchronized time based on the reference time and the first time offset, each PA of the second set of PAs including a constant tone extension (CTE);
   wherein:
      the first set of PAs comprises a periodic advertisement with response (PAwR) train associated with the network entity; and
      the second set of PAs comprises a PA with CTE train associated with the wireless communication device.

2. The wireless communication device of claim 1, wherein the at least one processor is configured to:
   determine the synchronized time as a sum of the reference time and a multiple of a pre-determined time offset interval.

3. The wireless communication device of claim 2, wherein:
   information associated with the pre-determined time offset interval is received from the network entity; and
   a length of the pre-determined time offset interval is the same as a length of a sub-division of a periodic advertisement with response (PAwR) subframe.

4. The wireless communication device of claim 1, wherein the synchronization information is included in an access point synchronization (AP_SYNC) packet.

5. The wireless communication device of claim 4, wherein the reference time is a time associated with transmission of the AP_SYNC packet.

6. The wireless communication device of claim 3, wherein:
   the subframe includes a plurality of non-overlapping time slots, the plurality of non-overlapping time slots including a subset of reserved time slots for PAwR responses and a subset of non-reserved time slots; and
   each PA of the second set of PAs is transmitted using a particular time slot of the subset of non-reserved time slots.

7. The wireless communication device of claim 6, wherein the subset of reserved time slots includes a plurality of access point synchronization (AP_SYNC) response slots, the plurality of AP_SYNC response slots and the reserved time slots associated with different durations.

8. The wireless communication device of claim 7, wherein the plurality of AP_SYNC response slots includes at least three AP_SYNC response slots.

9. The wireless communication device of claim 1, wherein the at least one processor is configured to:
   determine one or more parameters associated with forming a PA train, the one or more parameters based on a slot index included in the synchronization information;
   transmit, to the network entity, the one or more parameters;
   form the PA train using the one or more parameters; and
   transmit the second set of PAs using the PA train.

10. The wireless communication device of claim 9, wherein:
   a first time slot of the PA train is associated with the second set of PAs including the CTE; and
   a second time slot of the PA train is associated with an additional set of PAs, each PA of the additional set of PAs including the CTE and transmitted on the PA train by a second wireless communication device.

11. The wireless communication device of claim 9, wherein the at least one processor is configured to determine the one or more parameters associated with forming the PA train based on the synchronization information including an invalid value for one or more pre-determined fields.

12. The wireless communication device of claim 11, wherein the one or more pre-determined fields include one or more of a group ID field, an access address field, or an event counter field.

13. The wireless communication device of claim 1, wherein the network entity is an access point (AP).

14. The wireless communication device of claim 1, wherein the wireless communication device is an electronic shelf label (ESL).

15. A wireless communication device for wireless communications, the wireless communication device comprising:
   at least one memory; and
   at least one processor coupled to the at least one memory and configured to:
      receive, from a network entity, synchronization information associated with a first set of periodic advertisements (PAS);
      determine, based on the synchronization information, a first time offset from a reference time, wherein the reference time is associated with synchronization of a plurality of wireless communication devices including the wireless communication device; and
      receive, from a second wireless communication device of the plurality of wireless communication devices, a second set of PAs at a synchronized time based on the first time offset and the reference time, each PA of the second set of PAs including a constant tone extension (CTE);
   wherein:
      the first set of PAs comprises a periodic advertisement with response (PAwR) train associated with the network entity; and
      the second set of PAs comprises a PA with CTE train associated with the second wireless communication device.

16. The wireless communication device of claim 15, wherein the at least one processor is configured to:
   determine the synchronized time as a sum of the reference time and a first multiple of a pre-determined time offset interval.

17. The wireless communication device of claim 16, wherein:
   information associated with the pre-determined time offset interval is received from the network entity; and
   a length of the pre-determined time offset interval is the same as a length of a sub-division of a periodic advertisement with response (PAwR) subframe.

18. The wireless communication device of claim 16, wherein the at least one processor is further configured to:
   determine, based on the synchronization information, a second time offset from the reference time, the second time offset comprising a second multiple of the pre-determined time offset interval different from the first multiple; and
   receive, from a third wireless communication device of the plurality of wireless communication devices, a PA including a CTE at a second synchronized time based on the reference time and the second time offset.

19. The wireless communication device of claim 15, wherein the synchronization information is synchronization information generated by the second wireless communication device and associated with transmitting one or more PA CTEs received by the wireless communication device.

20. The wireless communication device of claim 15, wherein the synchronization information is included in an access point synchronization (AP_SYNC) packet.

21. The wireless communication device of claim 20, wherein the reference time is a time associated with transmission or reception of the AP_SYNC packet.

22. The wireless communication device of claim 19, wherein the synchronization information includes one or more of a slot index associated with the wireless communication device, a group ID field, an access address field, or an event counter field.

23. The wireless communication device of claim 17, wherein:
   the subframe includes a plurality of non-overlapping time slots, the plurality of non-overlapping time slots including a subset of reserved time slots for PAwR responses and a subset of non-reserved time slots; and each PA of the second set of PAs is received using a particular time slot of the subset of non-reserved time slots.

24. The wireless communication device of claim 23, wherein the subset of reserved time slots includes a plurality of access point synchronization (AP_SYNC) response slots, the plurality of AP_SYNC response slots and the reserved time slots associated with different durations.

25. The wireless communication device of claim 24, wherein the plurality of AP_SYNC response slots includes at least three AP_SYNC response slots.

26. The wireless communication device of claim 15, wherein the at least one processor is configured to:
  receive, from the second wireless communication device, the second set of PAs using a first time slot of a PA CTE train; and
  receive, from a third wireless communication device, a third set of PAs using a time slot of the PA CTE train different from the first time slot, wherein the second set of PAs and the third set of PAs each include one or more PA CTEs.

27. The wireless communication device of claim 15, wherein the network entity is an access point (AP).

28. The wireless communication device of claim 15, wherein the wireless communication device is an electronic shelf label (ESL).

\* \* \* \* \*